(12) United States Patent
Rasmussen et al.

(10) Patent No.: US 11,244,023 B2
(45) Date of Patent: Feb. 8, 2022

(54) SYSTEM FOR CONNECTING TOPICALLY-RELATED NODES

(71) Applicant: Caterpillar Inc., Deerfield, IL (US)

(72) Inventors: Beverly Marie Rasmussen, Peoria Heights, IL (US); Leonard Stewart, Edwards, IL (US); James L. Babin, Glasford, IL (US); Tazio Stephan Grivetti, Peoria, IL (US); Charles Todd Farwell, Morton, IL (US); Willibald Gustav Berlinger, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 47 days.

(21) Appl. No.: 16/186,022

(22) Filed: Nov. 9, 2018

(65) Prior Publication Data
US 2020/0151225 A1    May 14, 2020

(51) Int. Cl.
| G06F 16/958 | (2019.01) |
| G06F 16/955 | (2019.01) |
| G06F 3/0484 | (2013.01) |
| G06F 3/0482 | (2013.01) |
| G06F 3/0483 | (2013.01) |

(52) U.S. Cl.
CPC .......... *G06F 16/958* (2019.01); *G06F 3/0482* (2013.01); *G06F 3/0483* (2013.01); *G06F 3/0484* (2013.01); *G06F 16/9558* (2019.01)

(58) Field of Classification Search
CPC .. G06F 17/2235; G06F 3/0482; G06F 16/958; G06F 16/9558; G06F 3/0483; G06F 3/0484
USPC ................. 715/205, 200, 255, 207
See application file for complete search history.

(56) References Cited

U.S. PATENT DOCUMENTS

| 7,340,442 | B2 | 3/2008 | Jeanblanc et al. |
| 8,521,661 | B2 | 8/2013 | Wang et al. |
| 8,539,359 | B2 | 9/2013 | Rapaport et al. |
| 9,460,059 | B2 * | 10/2016 | Sharma ............... G06F 17/2247 |
| 9,836,761 | B2 | 12/2017 | Bosworth et al. |
| 2005/0273730 | A1 * | 12/2005 | Card ..................... G06F 16/954 |
| | | | 715/853 |

(Continued)

OTHER PUBLICATIONS

Ashwani Tiwari, Quick Tips to Convert Multiple PDF to Single PDF Document, Published Aug. 2018, systoolsgroup.com, pp. 1-14 (pdf).*

*Primary Examiner* — Manglesh M Patel
(74) *Attorney, Agent, or Firm* — Lee & Hayes, PLLC

(57) ABSTRACT

A method includes storing a plurality of content items and storing one or more associations. Each of the associations includes an association between exactly two of the content items. The method may also include causing a graphical user interface (GUI) to be presented on an electronic device. The GUI may include a first representation of a first content item, a list of representations comprising a second representation of a second content item and a third representation of a third content item, a first visual indicator indicating a first association between the first content item and the second content item, and a second visual indicator indicating a second association between the first content item and the third content item. The method may also include receiving a user input comprising an instruction to create an additional association between the first content item and the second content item.

20 Claims, 10 Drawing Sheets

(56) References Cited

U.S. PATENT DOCUMENTS

| | | | |
|---|---|---|---|
| 2006/0015803 A1* | 1/2006 | Holloway | G06F 40/143 |
| | | | 715/205 |
| 2008/0228789 A1* | 9/2008 | Asakawa | G06F 17/2247 |
| 2010/0082625 A1* | 4/2010 | Tsai | G06F 16/355 |
| | | | 707/737 |
| 2012/0011202 A1 | 1/2012 | Occhino et al. | |
| 2012/0041907 A1 | 2/2012 | Wang et al. | |
| 2013/0103720 A1* | 4/2013 | Miller | G06F 17/246 |
| | | | 707/798 |
| 2013/0282889 A1* | 10/2013 | Tito | H04L 43/00 |
| | | | 709/224 |
| 2015/0347411 A1 | 12/2015 | Friggeri et al. | |
| 2018/0046986 A1 | 2/2018 | Wang et al. | |
| 2019/0065615 A1* | 2/2019 | Room | G06F 16/90348 |

\* cited by examiner

SYSTEM FOR CONNECTING TOPICALLY-RELATED NODES

TECHNICAL FIELD

This disclosure relates generally to associating content created by multiple users of a system, and, more specifically, to systems that provide a platform enabling users to create links between content items and generating associations based on those links.

BACKGROUND

Networked computing systems have facilitated the collection of large amounts of data, and some recent attempts have focused on attempting to interpret this data for useful purposes. For instance, social networking sites employ algorithms to populate content feeds based on an underlying assumption of what may interest the user. Similarly, ecommerce businesses have developed algorithms that suggest products to shoppers based on the user's shopping history and shopping habits of many other users. In another example, application-based dating services suggest potential matches based on compatibility determined using information about individuals. However, many of these applications result in unhelpful suggestions, fail to provide suggestions outside of a few options, and/or are closed to the users. Accordingly, it may be useful to provide an open system that allows system users to create topical relationships between content and users and that actively introduces the user to additional, related content and users. Such systems may be useful to coordinate information across a large network or group of users, e.g., in which documents and projects are undertaken, and users are located, in disparate locales, environments, or the like.

An example system for selecting content and identifying users for identification to additional users of a social networking system is described in U.S. Patent Application Publication No. 2015/0347411 (hereinafter referred to as the '411 reference). In particular, the '411 reference describes a social networking feed populated with content items that are scored based on characteristics of those items. The system described in the '411 reference may consider characteristics including the identity of users providing the content items, locations associated with the system users, and interaction with content items by the users. The '411 reference does not, however, disclose details related to an open system in which users create associations between content items and those content items are organized according to those associations. The '411 reference also does not disclose creation of content items and association of those items with users of the system. As a result, the techniques described in the '411 reference may create a closed system that inhibits discovery of new data and user interaction with the system.

Example embodiments of the present disclosure are directed toward overcoming the deficiencies described above.

SUMMARY

In an aspect of the present disclosure, a method includes storing a plurality of content items and storing one or more associations. Each of the one or more associations includes an association between exactly two of the plurality of content items. The method may also include causing a graphical user interface to be presented on a display of an electronic device. The graphical user interface may include a first representation of a first content item of the plurality of content items, a list of representations comprising a second representation of a second content item of the plurality of content items and a third representation of a third content item of the plurality of content items, a first visual indicator indicating that a first association of the one or more associations exists between the first content item and the second content item, and a second visual indicator indicating that a second association of the one or more associations exists between the first content item and the third content item. The method may also include receiving a user input at the first graphical user interface, the user input comprising an instruction to create an additional association between the first content item and the second content item, based at least in part on the user input, updating the first visual indicator to a third visual indicator, and based at least in part on the user input, storing an association between the first content item and the second content item as an additional association of the one or more associations.

In another aspect of this disclosure, a system includes one or more processors and memory storing instructions executable by the one or more processors to cause the system to perform acts. The acts may include storing a plurality of content items comprising a first content item and one or more second content items and storing one or more associations. Each of the one or more associations is between the first content item and one of the one or more second content items. The acts may further include causing a graphical user interface to be presented on a display of an electronic device. The graphical user interface may include a first representation of the first content item and a second representation of a second content item of the one or more second content items. The acts may further include receiving a user input at the first graphical user interface, the user input comprising an indication associating the first content item and the second content item; and based at least in part on the user input, storing an association between the first content item and the second content item as an additional association in the one or more associations.

In yet another aspect of this disclosure, a system includes one or more processors and memory storing instructions executable by the one or more processors to cause the system to perform acts. The acts may include storing a plurality of content items and storing one or more associations. Each of the one or more associations includes an association between exactly two of the plurality of content items. The acts may further include causing a graphical user interface to be presented on a display of an electronic device. The graphical user interface may include a first representation of a first content item of the plurality of content items, a list of representations comprising a second representation of a second content item of the plurality of content items and a third representation of a third content item of the plurality of content items, a first visual indicator indicating that a first association of the one or more associations exists between the first content item and the second content item, and a second visual indicator indicating that a second association of the one or more associations exists between the first content item and the third content item. The acts may further include receiving a user input at the first graphical user interface, the user input comprising an instruction to create an additional association between the first content item and the second content item; based at least in part on the user input, updating the first visual indicator to a third visual indicator, the third visual indicator indicating that a user associated with the electronic device has created the additional association; and based at least in part on the user input, storing an association between the first content item and the second content item as an additional association of the one or more associations.

DETAILED DESCRIPTION

Figure 1:
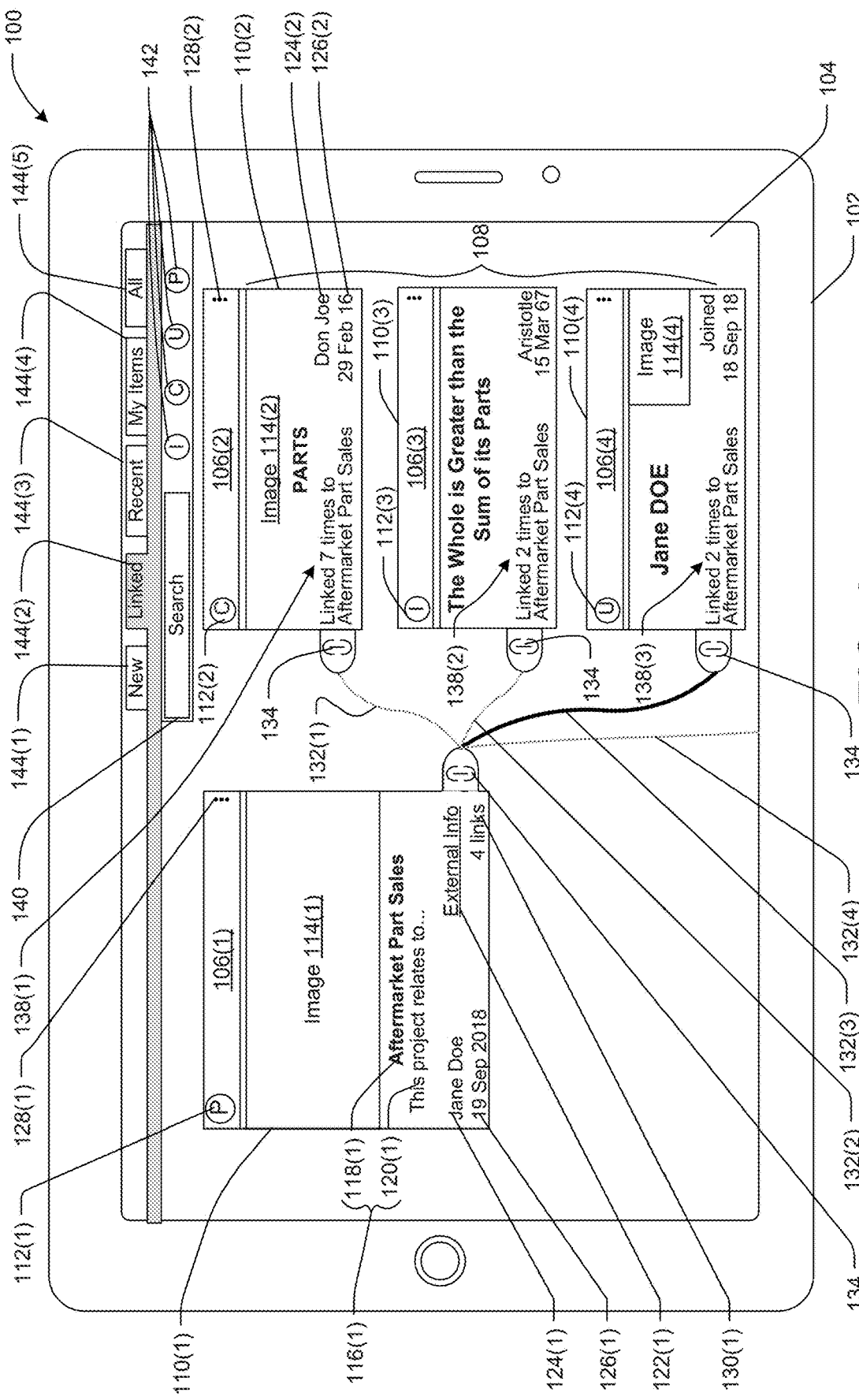
FIG. 1 is a schematic representation of a graphical user interface including representations of content, in accordance with an example embodiment of the present disclosure.

This disclosure generally relates to computer-based systems that provide an interactive platform that promotes creation of new content and on which users can discover other users and content. Wherever possible, the same reference numbers will be used through the drawings to refer to the same or like features. Referring to FIG. 1, an example graphical user interface (GUI) 100 for interacting with a user- and content-based platform is illustrated. More specifically, FIG. 1 illustrates a user device 102 having a display 104. The user device 102 is illustrated as a handheld device, such as a tablet device, although in other implementations, the user device 102 may be any number of electronic devices, e.g., a desktop computer, a laptop computer, a smart phone, or the like, including a display and facilitating user interaction with the display 104. The display 104 is configured to display or otherwise render the GUI 100.

In the example of FIG. 1, the user device 102 has accessed a service or application and the GUI 100 has been displayed on the display 104 of the user device 102. In examples described herein, the GUI 100 provides a user of the user device 102 with access to content items and information stored in one or more databases and originating from one or more users of the system. More specifically, the illustrated GUI 100 includes a plurality of content item representations including a first representation 106(1), a second representation 106(2), a third representation 106(3), and a fourth representation 106(4). Collectively, two or more of the representations 106(1), 106(2), 106(3), 106(4) and/or additional content item representations may be referred to herein as "the representations 106" or "the content representations 106." Each of the representations 106 is representative of or comprises a content item created by a user of the service or application. For example, and as described further herein, a content item may be a collection of data, information, and/or other content, and each representation 106 may be a visual representation of a content item. In some examples, the representation 106 may include one or more visual representations of some or all of the data and/or information (e.g., the underlying data making up the content item) for the respective content item. Thus, in some examples, a content item may comprise one or more types of content, including but not limited to textual content, image content, user information, data about the content item, e.g., an identification of the creator of the content item, the date and/or time on/at which the content item was created, or the like. In some instances, a user may create a content item, e.g., by uploading or entering content, and information about the content item may be automatically generated, e.g., the date/time of creation, an identity of the creator, or the like, and associated with the content item. Thus, the content item may include content created by the user and information included in the content item by the system, without affirmative action by the user. In still further examples, a content item may be generated automatically. For example, and as discussed further below, one type of content item may be a user profile, and user profiles may be generated automatically, e.g., upon a user joining an enterprise or other group that uses the systems described herein, upon the user enrolling in the systems, or the like.

The GUI 100 provides a mechanism via which a user of the user device 102 may browse, discover and organize the representations 106 and therefore the content items associated with those representations 106. In the illustration of FIG. 1, the first representation 106(1) is provided on a left side of the display 104, whereas the second representation 106(2), the third representation 106(3), and the fourth representation 106(4) are provided as a list 108 spaced from the first representation 106(1). The first representation 106(1) may be representative of a first content item, which may represent a selected, primary, or "in-focus" content item, whereas the list 108 may include representations of additional content items that are in some way related to or associated with the first content item. Although the arrangement of FIG. 1 illustrates the first representation 106(1) on the left of the with the list 108 being on the right, other arrangements are contemplated. For example, the first representation 106(1) could be centrally located proximate a top of the display 104 with the list being horizontally-arranged below the first representation 106(1). Other arrangements of the first representation 106(1) and the list 108 may also be used. Moreover, although the list 108 is illustrated as including the second representation 106(2), the third representation 106(3), and the fourth representation 106(4), the list 108 may include any non-zero number of representations. In some examples, additional representations may be accessed by scrolling, selecting a "more" button, or some other interactive control.

In examples described herein, each of the representations 106 is a graphical representation rendered on the display that is indicative of a content item that is at least one of created by or created in connection with a user of the system. In the illustrated example, the first representation 106(1) may include a first boundary 110(1) that generally delineates the first representation 106(1). The first representation 106(1) may also include a first type designation 112(1) indicating a type of the content. For example, the first type designation 112(1) may include a "P" in FIG. 1, which may indicate that the first representation 106(1) relates to a project. Content types are described in more detail herein, and may be optional in some implementations. The first representation 106(1) may also include a first image 114(1) and first text 116(1) within the first boundary 110(1). The first image 114(1) may be a digital image or other graphical representation and may be optional. The first text 116(1) may include a first title 118(1) associated with the first content item, e.g., "Aftermarket Parts Sales," and/or a first description 120(1) associated with the item. In the example in which the first representation 106(1) is indicative of a project (e.g., a content item) that relates to "Aftermarket Parts Sales," the first description 120(1) may be additional information about the project, which may include project objectives, timelines, team members, budgets, or any other textual information included by a creator. In some implementations, the first representation 106(1) may also include a first access control 122(1) to access additional content associated with the first representation. The first access control 122(1) may include a hyperlink or other reference to another source, documentation, site, or the like. The first image 114(1), the first text 116(1), and/or the first access control 122(1) may include information or data (e.g., content) provided by a user. For instance, a user may select or otherwise provide the first image 114(1), the first title 118(1), the first description 120(1), and information about the information accessible via the first access control 122(1). Implementations described herein are not limited to the information and data shown in the first representation 106(1) (or any of the representations 106), as users may be able to create content items using many types of information and data and may configure the representations 106 in myriad ways. Other example representations are described further herein.

The first representation 106(1) is illustrated as also including a first user name 124(1), which may be a name of the user that created the content item, and a first date 126(1), which may be a date on which the user created the content item. The first representation 106(1) may also include one or more additional controls 128(1) that allow the user to interact with the first representation 106(1). For instance, selecting the additional control(s) 128(1) may allow a user to expand the first representation 106(1), e.g., to more fully see the first image 114(1) and/or to read more of the first title 118(1) and/or the first description 120(1). By way of non-limiting example, selection of the additional control(s) 128(1) may open a menu of options available to the user to interact with the first representation 106(1). For instance, the user may be able to flag the first representation, e.g., as a favorite or content to return to, the user may be able to link the representation 106(1) to other content, including the user's profile, as described further herein, and/or the user may be able to obtain additional information about the content item. Other interaction options that may be facilitated by selection of the additional control(s) 128(1) are described further herein.

As will be appreciated, the first representation 106(1) may be akin to a post, such as a social media post, that itself conveys information and/or data comprising the content item and/or which may direct a user to additional information and/or data, e.g., via the first access control 122(1). In the example, the first representation is indicative of a project (e.g., a content item) that relates to "Aftermarket Product Sales" and was created by Jane Doe on Sep. 19, 2018. Jane Doe also may have related additional information to the project, e.g., documents contained in a repository, a blog post, a web site, or other information which may be accessible via the first access control 122(1). Thus, in this example of FIG. 1, Jane Doe has created a content item by providing and/or identifying the information/content about her Aftermarket Sales Project, and first representation 106(1) is a visual indication of that content item.

Implementations of this disclosure may be useful to link or associate content items, e.g., to allow a user to discover new content and/or users. FIG. 1 illustrates that the first representation 106(1) may also include a first link count 130(1). The first link count 130(1) may identify a number of content items, e.g., identified by additional of the representations 106, to which the first content item is associated or linked. As used herein, a link or association may be a one-to-one relationship between content items, with content items, and content items may include user profiles. Thus, in the example of FIG. 1, the first link count 130(1) indicates that the first content item (indicated by the first representation 106(1) is linked to or associated with four (4) content items. As described further herein, in implementations, the links or associations are created by users of the system, e.g., by a user of the system interacting with the GUI 100. In the example of FIG. 1, the list 108 is populated with the second representation 106(2), the third representation 106(3), and the fourth representation 106(4), whereas a fifth representation (not shown), corresponding to the fourth linked content item is not visible on the display 104. In addition to being included in the list 108, in the embodiment of FIG. 1, these associations or links are illustrated by a first line 132(1) between the first representation 106(1) and the second representation 106(2), a second line 132(2) between the first representation 106(1) and the third representation 106(3), a third line 132(3) between the first representation 106(1) and the fourth representation 106(4), and a fourth line 132(4) extending from the first representation and appearing to go off the screen, e.g., to another representation below the fourth representation 106(4). The user may view additional representations in the list 108, such as a representation visualizing the fourth linked content item by scrolling down. In some implementations, the GUI 100 may be configured such that the list 108 is scrollable independent of the first representation 106(1). The GUI 100 may also or alternatively use other controls to see additional representations.

In the illustrated embodiment of FIG. 1, the first line 132(1), the second line 132(2), and the fourth line 132(4) are relatively lighter than the third line 132(3). In this example, the disparate coloring is used to show that the user accessing the GUI 100 on the user device 102 has linked the first content item, visualized by the first representation 106(1), to the content item visualized by the fourth representation 106(4), but has not linked the first content item to either of the content items visualized by the second representation 106(2) or the third representation 106(3). In the example, because at least one link exists between the first representation 106(1) and each of the representations 106(2), 106(3), 106(4) in the list 108, a "linked" graphic 134 may also be present on each of the first representation 106(1), the second representation 106(2), the third representation 106(3), and the fourth representation 106(4). In other implementations, the second representation 106(2) and the third representation 106(3) may have an "unlinked" graphic (not shown) demonstrating the user has not linked the first content item (visualized by the first representation 106(1)) with the content items associated with the second representation 106(2) and the third representation 106(3). In this instance, both the lighter-weight lines 132(1), 132(2) and the unlinked graphics on the second and third representations 106(2), 106(3) may provide visual clues to the user that, while those content items have been linked by someone, the user has not linked those content items.

Thus, the GUI 100 visualizes the first representation 106(1) as a primary, or in-focus, representation of a first content item and the list 108 as representations that visualize linked or associated content items. The second representation 106(2), the third representation 106(3), and the fourth representation 106(4) may be similar to the first representation 106(1). For instance, the second representation 106(2) includes a second boundary 110(2), a second type designation 112(2), a second image 114(2), a second user name 124(2), a second date 126(2), and second additional control(s) 128(2). As illustrated, these features may be arranged differently and may include different information. For instance, the type designation 112(2) is designated by the letter "C," which may indicate that the representation 106(2) is directed to a content item that is a "category." In the illustrated example, the category has the title "Parts." Category, like "projects," may be a type of content item that can be included in the systems described herein. In this example, the category may include only a second title, like the first title 118(1), and may not include a description, like the description 120(1). In other implementations, a description may be included in addition to or instead of the title. The second representation 106(2) may also include an access control, similar to the access control 122(1), but such is not illustrated or required. Also different from the first representation 106(1), the second representation 106(2) may include a first link counter 138(1). The first link counter 138(1) indicates how many times the content item represented by the second representation 106(2) (e.g., a second content item) has been linked to the content item represented by the first representation 106(1) (e.g., the first content item). For example, the first link counter 138(1) may depict the number of users who have linked the second content item to the first content item. Accordingly, in the illustrated example, the first link counter 138(1) is different from the link count 130. Whereas the first link counter 138(1) depicts the number of times the first content item has been linked to the second content item, the link count 130 depicts the number of content items to which the first content item is linked. Although not illustrated, in some implementations, the second representation 106(2) could also include its own link count like the link count 130. Thus, as noted above, the user associated with the user device 102 has not linked the first content item to the second content item (as evidenced by the weight of the line 132(1)). If she were to so link the content items, however, the link count 130 shown in the first representation 106(1) would not change (because the two content items are already linked), whereas the first link counter 138(1) would change. In this instance, the first link counter 138(1) would be incrementally increased to show that eight (8) users have now linked the first content item to the second content item. In some examples, a value associated with the first link counter 138(1) may be a link strength or link score, e.g., because that number illustrates how many people agree that the two content items are related and thus should be linked. As discussed further herein, in some implementations of this disclosure, each user may have a binary choice, i.e., to either link content items or not link content items, but each individual user may not link two content items more than once. Future systematic interfaces could allow for relational information to be leveraged from systems outside of the one shown in display 104 and included in both links and link counters. While the examples herein depict link creation as exclusively triggered by the actions of a user, relational information could be inferred and factored in from multiple sources.

The third representation 106(3) is similar to the second representation 106(2) and includes a third boundary 110(3), a third type designation 112(3), third text (not labelled), a third user name (not labelled), a third date (not labelled), third additional control(s) (also not labelled), and a second link counter 138(2). As illustrated, these features may be arranged differently and may include different content. For instance, the type designation 112(3) is designated by the letter "I," which may indicate that the representation 106(3) is directed to a content type comprising an "idea." In the illustrated example, the idea consists of the third text. "Idea," like "categories" and "projects," may be a type of content item that can be included in the systems described herein. In this example, the idea may include only the third text and my not include a title or an image. As discussed above with reference to the first link counter 138(1), the second link counter 138(2) indicates how many times the content item represented by the third representation 106(3) (e.g., a third content item) has been linked to the first content item, e.g., how many different users have made the association between the first content item and the third content item.

The fourth representation 106(4) is similar to the second representation 106(2) and/or the third representation 106(3) and includes a fourth boundary 110(4), a fourth type designation 112(4), a fourth image 114(4), fourth text (not labelled), a fourth date (not labelled), fourth additional control(s) (not labelled), and a third link counter 138(3). As illustrated, these features may be arranged differently and may include different content. For instance, the fourth type designation 112(4) includes the letter "U," which may indicate that the representation 106(4) is directed to a "user" content item. In the illustrated example, the fourth representation 106(4) consists of the user's name as the fourth text and may include an image of the user, an avatar, or the like, as the fourth image 114(4). "User," like "categories" and "projects," may be a type of content item that can be included in the systems described herein. In this example, the user content item may be a user profile, and may include only the name of the user as the fourth text and the fourth image 118(4), although in other implementations, the fourth image 118(4) may not be included and/or additional information about the user may be included. As discussed above with reference to the first link counter 138(1), the third link counter 138(3) indicates how many times the content item of the fourth representation 106(4), e.g., the user profile and therefore the user, has been linked to the first content item. The fourth date may be representative of the date on which the user joined the system, created a first content item, or the like, for example. In other implementations, a user profile, e.g., a user content item, may be created for each individual associated with an enterprise or group of people using the systems described herein. In the illustrated example, the fourth representation 106(4) is indicative of the user "Jane Doe," and the in-focus project of the first representation 106(1) was created by Jane Doe (as demonstrated by the user name 124(1)). In implementations of this disclosure, when a user creates a content item, that user may be automatically linked to that content item. Automatic links can be made permanent or could be removed by the user that acted in a way that lead to the creation of a link. As will be appreciated, because the third line 132(3) indicates that the active user, i.e., the user accessing the GUI 100 on the user device 102, has linked the content of the first representation 106(1) to the user of the fourth representation 106(4), the active user may be Jane Doe. Alternatively, the user may be a user who has created another link between the first content item and Jane Doe's user profile.

As noted above, the system may be useful in many different applications and the specific application may lend itself to different types of content items. In the example of FIG. 1, the system may be useful for an enterprise to provide collaboration between users and/or to provide users of the system with a way to search enterprise-wide knowledge. For instance, employees, owners, vendors, shareholders, and/or any other person associated with the enterprise may become a user of the system to create, view, browse, and/or associate content items. In the example, once the person registers as a user, a user profile is created and may be visualized in the system like the fourth representation 106(4). Alternatively, the system may be configured to automatically generate a user profile for each employee or other person, for example, upon first login through an existing organization's portal or regardless of the whether that person has started using the system. The user may also post a content item as a project (as in the first representation 106(1)), as a category (as in the second representation 106(2), or as an idea (as in the third representation 106(3)). In some implementations, each of the different content item types may have diverse types of content. For instance, an idea may be limited to a relatively fewer number of characters, whereas a project may allow for a longer textual description. Categories may also be limited by character length, e.g., to a concise title. When used in an enterprise, one or more of the types may also allow for linking to external content, e.g., content stored in document management systems in use at the enterprise, content available via the Internet, or the like. For example, the idea and project content item types may allow for linking to content, whereas the category-type may not. The four content item types are for example only, and other implementations may use more or fewer types. For example, in other implementations, the representations 106 may be representative of digital, electronic, and/or tangible items.

Figure 3:
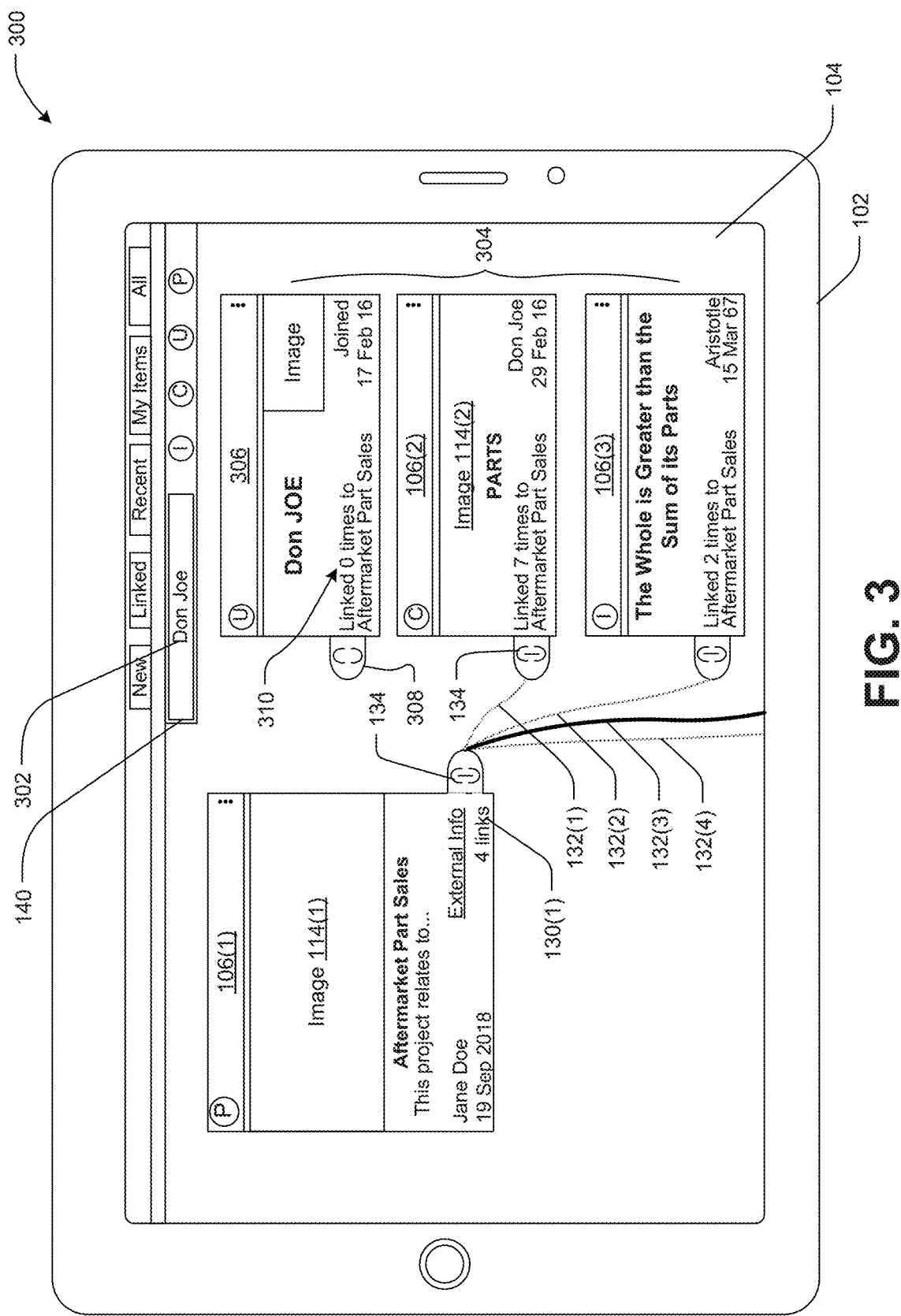
FIG. 3 is a schematic representation of another graphical user interface including representations of content suggested by a search, in accordance with an example embodiment of the present disclosure.
Figure 4:
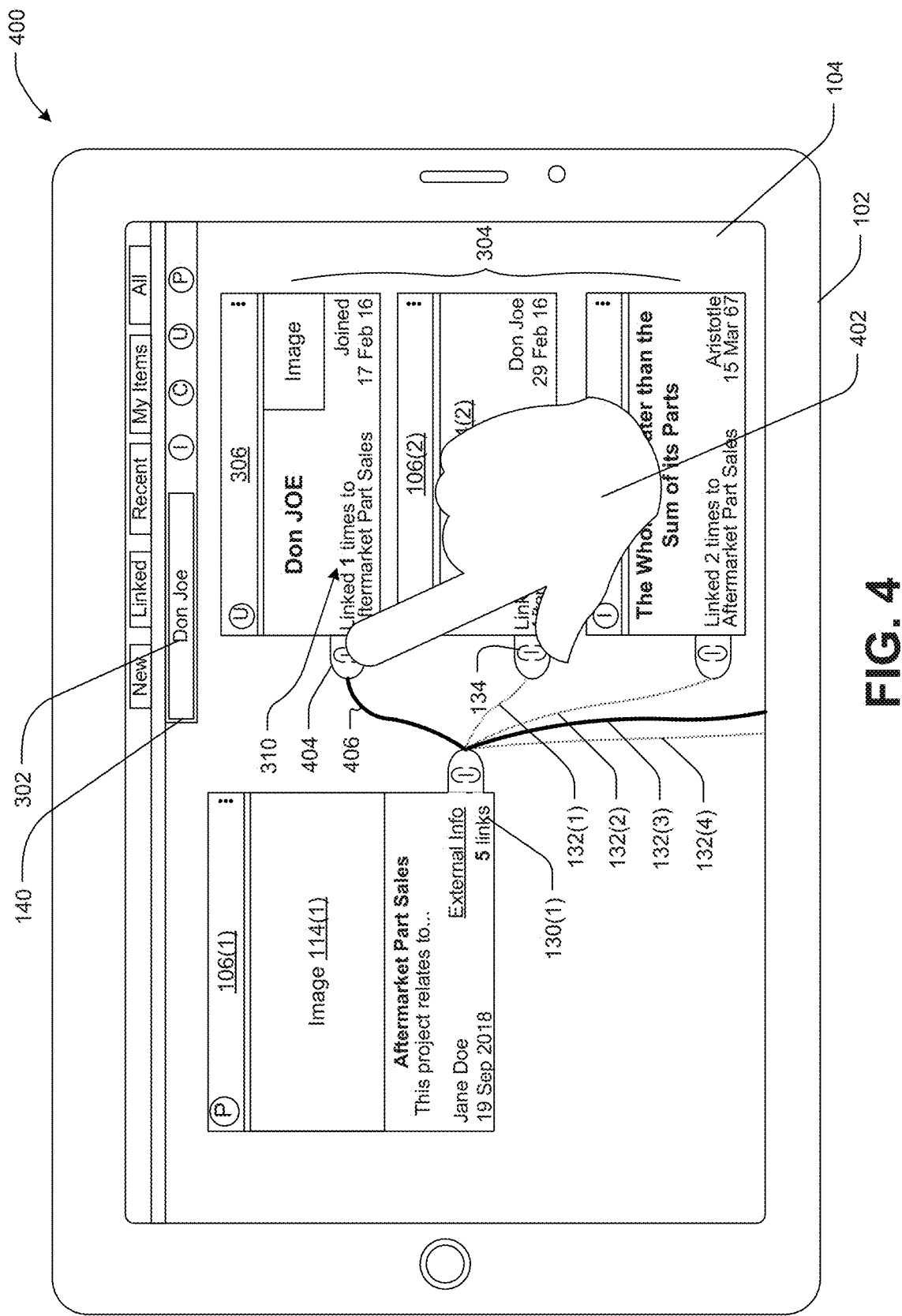
FIG. 4 is a schematic representation of another graphical user interface including techniques for linking search results with other content, in accordance with an example embodiment of the present disclosure.

The GUI 100 also includes a number of additional features, many of which may be useful to browse and/or search for content items. For example, FIG. 1 illustrates a search bar 140, via which the user may perform a text search to look for content items in the system. Searches may be limited to content items displayed on the search bar or may provide a global search of the system. Search results make included content items that match the search, or are linked to categories that match the search text entered. In some examples, executing a search may cause the display to open a new window or present a new GUI that shows the search results as an array, similar to the array shown in FIG. 6 and discussed further below. In other examples, however, the search may provide one or more search results presented as additional representations in the list 108. FIGS. 3 and 4, discussed further below, are examples of such a search.

Returning now to FIG. 1, the GUI 100 may also include type filters 142, which may allow the user to filter the representations 106 to include only those of one or more content item types. As illustrated, the type filters 142 may include graphics that correspond to the content item type designations 112. By way of non-limiting example, the user may interact with the GUI 100 by touching the display 104 at a position corresponding to the "U" type filter 142, and the GUI 100 may be updated to remove the second representation 106(2) (of the "category" or "C" type) and the third representation 106(3) (of the "idea" or "I" type). In other implementations, selecting the "U" type filter 142 may instead cause all "user" or "U"-type representations (e.g., the third representation 106(3)) to be removed from view.

Figure 5:
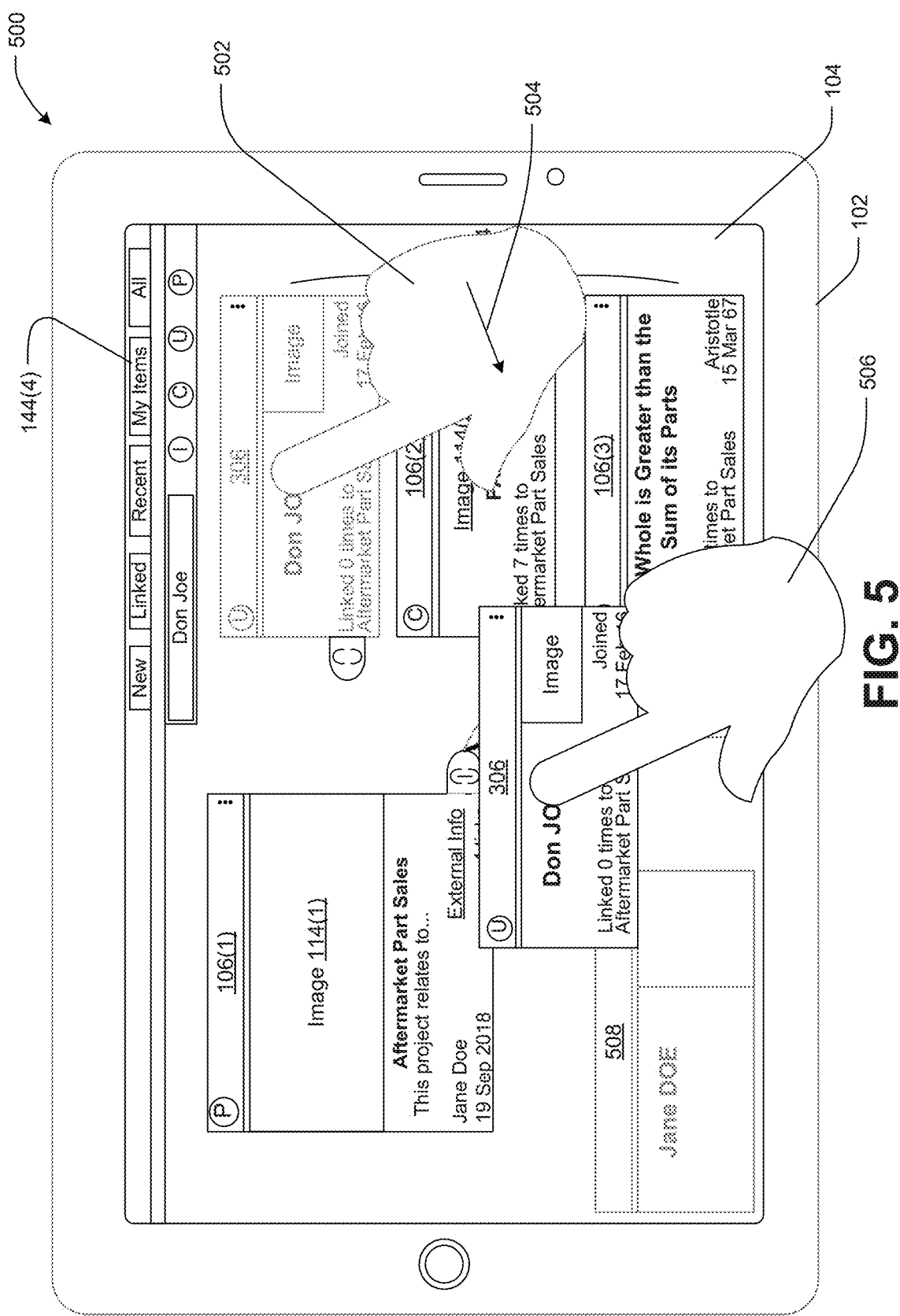
FIG. 5 is a schematic representation of another graphical user interface including techniques for linking content with a user profile, in accordance with an example embodiment of the present disclosure.

The GUI 100 may also include a first tab 144(1), a second tab 144(2), a third tab 144(3), a fourth tab 144(4), and a fifth tab 144(5) (collectively referred to herein as "the tabs 144"). Each of the tabs 144 may be associated with a different page or portion and may allow the user to navigate to additional GUIs and or to perform different functionalities. In the example of FIG. 1, the GUI 100 is associated with second tab 144(2), which is a "linked" tab. As discussed above, the GUI 100 may demonstrate content items linked to an in-focus content item. Selecting the first tab 144(1) may configure the display 104 to present an interface by which the user can create new content items. For example, the "new" tab may provide the user with access to one or more templates for including content of individual of the category, idea, and project type. The third tab 144(3) may be a "recent" tab, selection of which may illustrate most-recently viewed content items. The fourth tab 144(4) may be a "my items" tab, selection of which provides representations of content items that the user has linked to her user profile. At least one example of linking a content item to a user's profile is illustrated in FIG. 5, discussed further herein. In other examples, the "my items" tab may show items that the user has otherwise designated, e.g., by linking, selecting, flagging, or the like. By way of non-limiting example, a user may be given the option to add content items to "my items" by clicking on the additional control(s) 128, by right clicking on a representation and being presented with an option to save the content item, or in other ways, including the manner discussed below in connection with FIG. 5. The fifth tab 144(5) "all" tab Further details and examples related to the tabs are described further herein.

In some implementations, selecting the tabs 144 may also act as filters to the GUI 100. For instance, selecting the fourth tab 144(4), e.g., the "My Items" tab, may cause representations related to items saved by the user to be added to the list 108. In this way, when the user has a certain content item in focus, and thinks it may relate to something she has previously linked to her profile or otherwise flagged, selecting the "My Items" tab may cause the list to present all items linked to the user's profile or flagged for the user to easily link the content, if so desired. Similarly, selecting the third tab 144(3), e.g., the "recent" tab, may result in the list 108 being caused to include the content item representations most-recently viewed by the user.

Examples of interfacing with the GUI 100 now will be described in more detail with reference to FIGS. 2-6.

Figure 2:
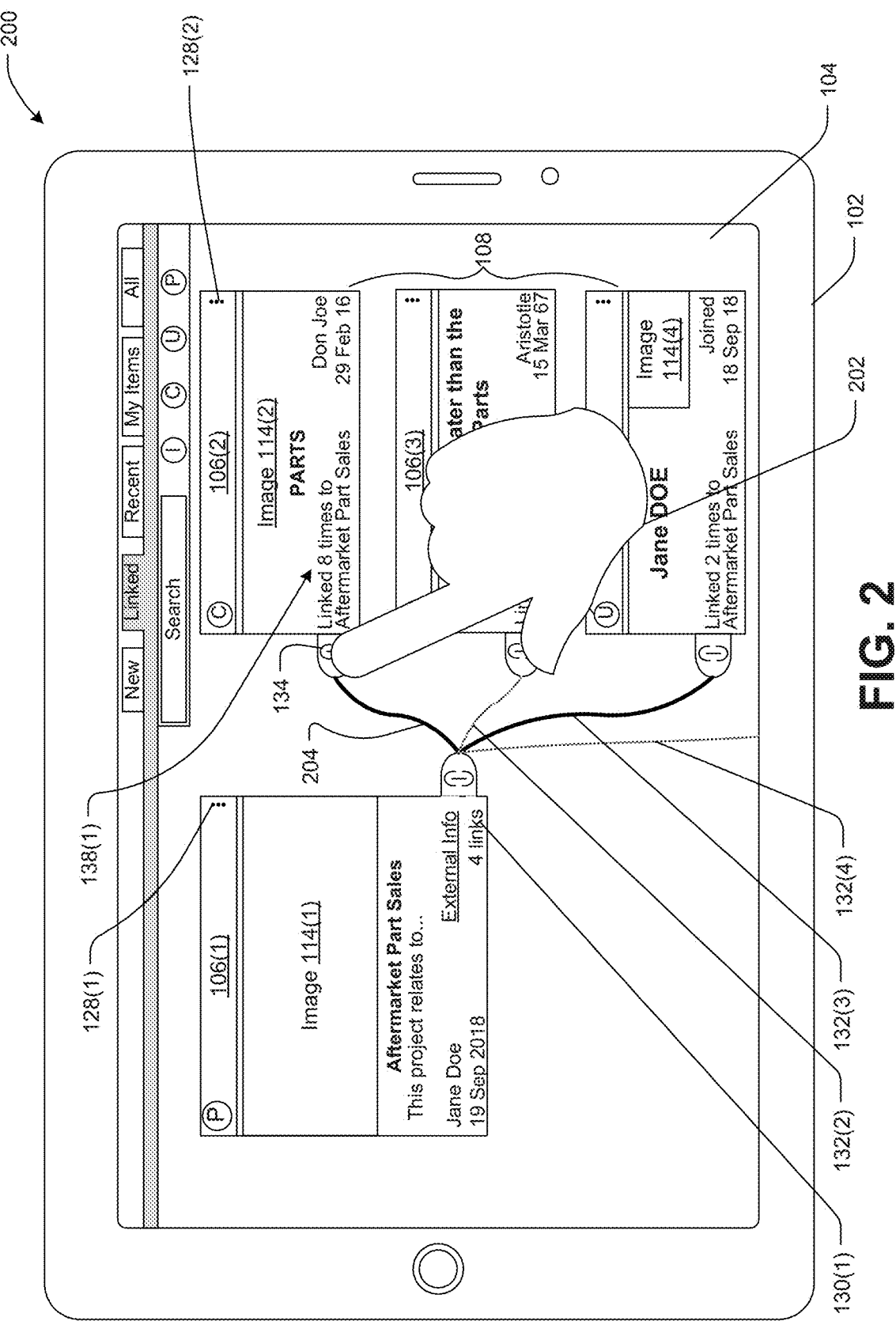
FIG. 2 is a schematic representation of another graphical user interface demonstrating techniques for linking content, in accordance with an example embodiment of the present disclosure.

As detailed above, in the GUI 100 the first representation 106(1) represents an in-focus content item, the list 108 includes representations 106 of other content items linked to the in-focus content item, and the lines 132 are used to indicate this link or association. Moreover, the first line 132(1), the second line 132(2) and the fourth line 132(4) may be shown differently than the third line 132(3). In the example, a user accessing the GUI 100 on the user device 102 has linked the content items of the first representation 106(1) and of the fourth representation 106(4) but has not linked the content item of the first representation 106(1) to the other content items. However, FIG. 2 illustrates an example of interacting with the GUI 100 to associate or link content items as discussed further herein. More specifically, FIG. 2 illustrates an updated GUI 200 on the display 104 of the user device 102 that has been rendered in response to a user 202 selecting the "linked" icon 134 associated with the second content item representation 106(2). More specifically, as a result of the user selection of the linked icon 134, the first line 132(1) has been replaced with, or has been updated to be, a linked line 204. In other embodiments, the user may select the line 132(1) to create the association between the content items. Moreover, although the line graphics and/or the linked icons 134 are shown in the example, additional visible indicia of the created link may also be provided. For instance, the linked graphic 134 may be altered or created in some way. As also illustrated, the link counter 138(1) has been incrementally increased, e.g., from seven (7) to eight (8), based on the user-created link between the content items. The link count of the first representation 106(1) remains unchanged, because the content of the second representation 106(2) was already linked, as described herein.

In addition to visually depicting the increased number of links, implementations described herein may also store the additional link, e.g., by incrementing a number of links between the two content items in a database or the like. In the example of FIG. 1, the number of links, e.g., the number of the link counter 138 may be used to rank items in the list 108. Thus, by linking the first content item and the content item of the second representation 106(2), the user 202 has affirmed the link or association, thereby strengthening that link. For instance, the act of affirming the link, as demonstrated by FIG. 2, may function like an "up-vote" or other action of promotion. Creating the user-specific link may serve other purposes, too. For example, the link may serve as clues to relationships. By way of non-limiting example, the act of the user 202 creating the link may indicate an interest by the user 202 in the content of the second representation 106(2). Such an interest may be useful to suggest content for the user (e.g., using a suggestion system as described further herein).

Although the example of FIG. 2 is described as the user 202 interacting with the linked graphic 134, the same effect may be achieved by interacting with the first line 132(1). Other interactions may also be used to achieve the effect. For instance, the user 202 may access a menu, e.g., as the additional control(s) 128(1), 128(2), to make the link. In other examples, the user 202 could drag the second representation 106(2) into proximity with the first representation 106(1). Other functionality for linking or associating the two representations 106(1), 106(2) may also be used to facilitate the user 202 linking the content items.

In addition to affirming links, aspects described herein also may be useful to associate or link content items that were previously unlinked. As noted above, the GUI 100 illustrates an example in which only already-linked content items are displayed. However, FIGS. 3 and 4 illustrate examples in which a user conducts a search to find new content items, and a user interaction to create a new link to that content item. In more detail, FIG. 3 illustrates an updated GUI 300 on the display 104 of the user device 102 in which a user has entered the search term 302 "Don Joe" into the search bar 140 to conduct a search for that user. For instance, the user may have realized that Don Joe created the category "parts" of the second representation 106(2) and wanted to find out more information about Don Joe. As shown in FIG. 3, as a result of the search, a revised list 304 is presented, which includes a new representation 306. Although only a single new representation 306 is illustrated, additional new representations may also be added, e.g., additional results of the search. In the illustrated embodiment, the new representation 306 is added to the top of the previous list 108 to make the revised list 304. However, in some implementations, the revised list 304 may only include the search results. Search results may be limited by the header tab 144 selection. Moreover, the search results may be ordered in the revised list 304 according to a match score or other metric that may indicate a closeness of each content item to the search query. As shown in FIG. 3, the representation 306 is indicative of the user Don Joe. The representation is substantially the same as the fourth representation 106(4) shown in FIG. 1, except that it includes Don Joe's information, not Jane Doe's. Specific elements of the new representation 306 are not described further herein.

In the GUI 300, the second representation 106(2) and the third representation 106(3) have been moved lower down the revised list 304 (relative to the list 108) and the fourth representation 106(4) is no longer shown on the display 104. However, the first line 132(1), the second line 132(2), and the third line 132(3) are still shown. Notably, there is no line between the linked graphic 134 associated with the first representation 106(1) and the new representation 306. The new representation 306 does include an unlinked graphic 308. As noted above, the lines 132 indicate that content items are linked and thus the absence of a line between the first representation 106(1) and the new representation 306 indicates that the first content item, designated by the first representation 106(1) has not been linked to Don Joe (or Don Joe's user profile). This is further illustrated by a link counter 310, which is substantially the same as the link counters 138. The link counter 310 textually indicates that Don Joe is not linked to the first content item. Systems described herein are open systems that allow users to create links or associations between content items. Thus, for example, the user may interact with the GUI 300 to link Don Joe to the project represented by the first representation 106(1).

Such an interaction is illustrated in FIG. 4. More specifically, FIG. 4 illustrates an updated GUI 400 in which a user 402 has selected the unlinked graphic 308 of FIG. 3, e.g., by touching a portion of the display 104 corresponding to the unlinked graphic 308. As illustrated, this selection of the unlinked graphic may link or associate the content item of the first representation 106(1), e.g., the first content item that is the project "Aftermarket Parts Sales," to the content item of the new representation 306, e.g., the user profile for Don Joe. More specifically, upon selecting the unlinked graphic 308, the unlinked graphic 308 is replaced by a linked graphic 404, which may be the same as the linked graphic 134. Moreover, a new line 406 is shown connecting the linked graphic 138 of the first representation 106(1) with the newly-presented linked graphic 404. As shown the new line 406 may be of a similar weight or appearance as the third line 132(3), which is differentiated from the first line 132(1), the second line 132(2), and the fourth line 132(4). As discussed above, the lines may be differentiated in appearance because the user 402 has linked the first content item of the first representation 106(1) to the fourth content item, e.g., the user profile for Jane Doe in this example, but has not linked the first content item to the second content item or the third content item. As also illustrated in FIG. 4, the link counter 310 may be updated to indicate one (1) link between Don Joe and the "Aftermarket Parts Sales" project. Moreover, the link count 130(1) of the first representation 106(1) may be updated to show that the project is now linked to five (5) other content items (the original four, and now Don Joe).

Because of the newly-created link between the Aftermarket Parts Sales project represented by the first representation 106(1) and Don Joe, subsequent users of the system may readily see the link. Accordingly, such a user looking for additional information, who may have been aware of the project, but not of Don Joe, e.g., because of their relative geographical locations, because the user is new to the enterprise, or the like, may now think to reach out to Don Joe for more assistance. Moreover, Don Joe may be alerted to the fact that he has been linked to a project, and he may choose to investigate further. Other benefits and use cases also are contemplated, and the examples of FIGS. 1-4 are examples only.

FIG. 5 illustrates additional aspects of this disclosure. More specifically, FIG. 5 illustrates an updated GUI 500 in which a user 502 has interacted with the GUI 300 to select and drag the new representation 306. For instance, implementations of this disclosure may include functionality to allow the user 502 to readily link any content item to the user's profile. In the illustrated embodiment, the user 502 has selected the new representation 306 and is dragging the new representation 306 generally in the direction of arrow 504, e.g., toward the bottom left corner of the display 104. As the new representation 306 is dragged relatively closer to the bottom left corner, e.g., when the user approaches a position 506, a user profile representation 508 may appear in the lower left corner of the display 104. By continuing to drag the new representation 306 to the user profile representation 508 and releasing the new representation 306 over the profile representation 508, a new association may be saved between the user 502 (Jane Doe in this example) and the content item represented by the new representation 306 (e.g., Don Joe in this example). In some examples, the profile representation 508 is not visible unless and until the user 502 drags a representation 106, 306 into proximity of the lower left corner of the display 104. In another example, the profile representation 508 is visible when an item is being dragged regardless of direction or location. This disclosure is not limited to the lower left corner; other predetermined positions may be used. In example GUIs described herein, space may be provided below the first representation 106(1) for the presentation of the profile representation, but in other implementations, the GUIs could be differently arranged, with a different portion of the display 104 providing a preferred spot.

The user 502 may implement this same procedure, e.g., the drag-and-drop technique, illustrated in FIG. 5 to associate any other content items with the user profile. For example, the user 502 could associate the category associated with the second representation 106(2) with her profile by dragging the second representation toward the bottom left corner, as described above. In some example, as described further herein, the user 502 may be able to access all items linked to her profile by selecting the "My Items" tab 144(4).

Figure 6:
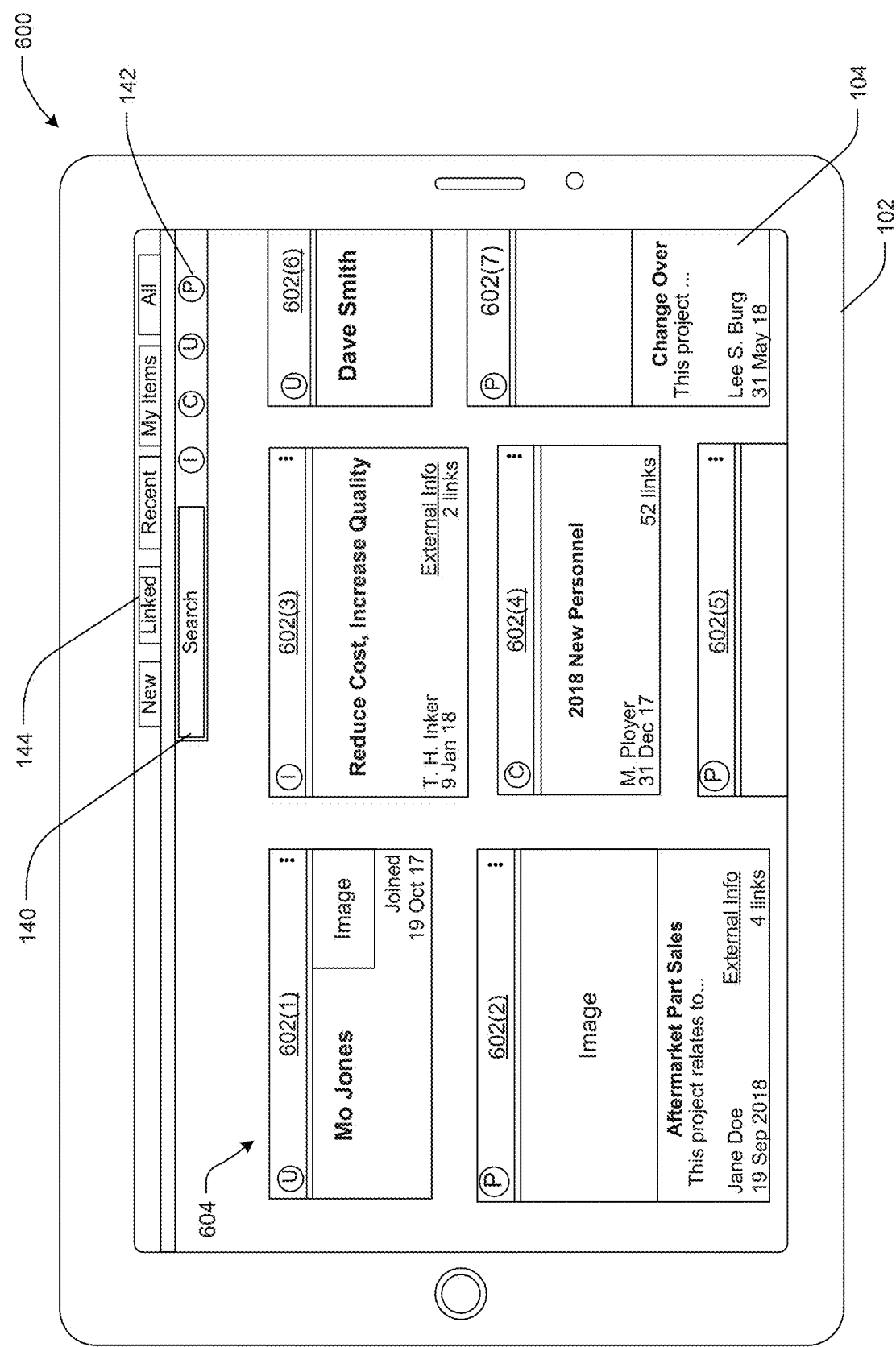
FIG. 6 is a schematic representation of another graphical user interface including representations of content, in accordance with an example embodiment of the present disclosure.

FIG. 6 illustrates additional aspects of this disclosure. More specifically, FIG. 6 illustrates an example GUI 600 that includes a number of representations 602 (including a first representation 602(1), a second representation 602(2), and so forth) of content items arranged in an array 604. Unlike other GUIs described herein, the GUI 600 does not graphically illustrate any links between content items. The GUI 600 may be presented on the display 104 as a home page, e.g. when the user device 102 logs into the application or program implementing techniques described herein. The array 604 arrangement of the GUI 600 may also be used in other instances. For example, the GUI 600 may show search results, show content items previously viewed or previously flagged by the user, content items recently added to the system (such as new users to the system or new ideas), or the like. In some examples, the representations 602 may indicate content items suggested as potentially of interest to the user, as further described below. For instance, content items that are within a threshold number of links, e.g., not linked, but two or three links away from the user's profile, may be shown on the GUI 600. Other configurations of the array 604 also are contemplated. By way of non-limiting example, the GUI 600 may include a plurality of arrays, e.g., a plurality of lists or rows, with each of the lists or rows having different content items. For example, a first row or line may include recently viewed content items, a second row or line may include suggested content items, and a third row or line may include user-created content items. Other groupings may be based on content item type, e.g., idea, category, user, or project, on user preferences, e.g., as identified by the user in a user profile, by geographic location or business unit of the user that created the content item, or any other criteria. Moreover, the representations 602 may be filtered using controls described herein, e.g., using the type filters 6 142, the search bar 140, the tabs 144, or the like.

As noted, no content item is "in focus" in the GUI 600. However, by selecting one of the representations 602, the user may select a content item to be in focus. For instance, in the GUI 600, the second representation 602(2) corresponds to the first representation 106(1). In some examples, selecting the second representation 602(2) may result in the GUI 100 being displayed to the user.

While certain functionality has been described in connection with the examples of FIGS. 1-6, the GUIs 100-600 are only examples. In addition to the alternatives described herein, additional implementations and functionality may also be appreciated with the benefit of this disclosure.

Figure 7:
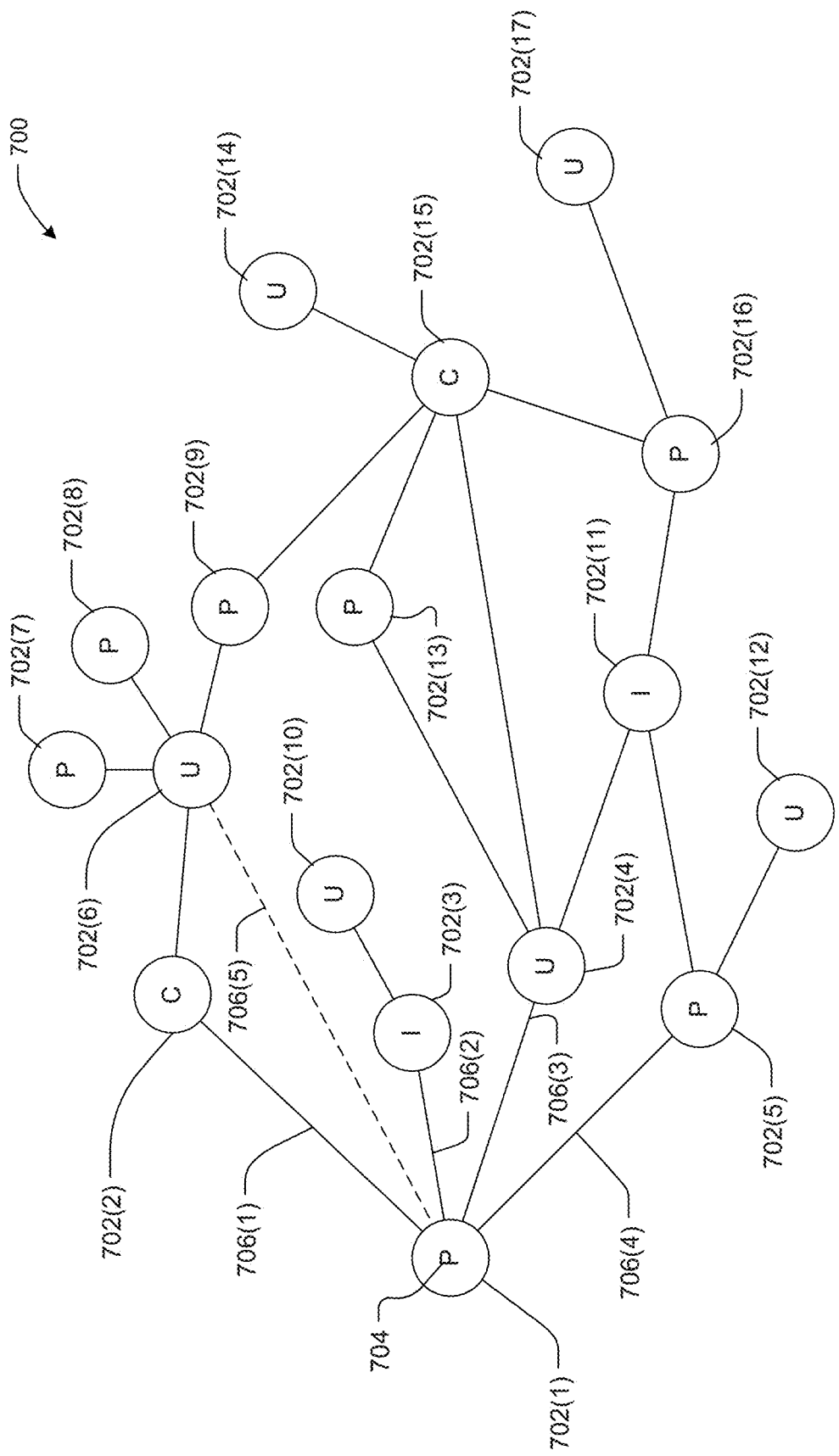
FIG. 7 is a schematic representation of a network of nodes, each representing a content item, in accordance with an example embodiment of the present disclosure.

FIG. 7 is an example schematic that may be useful for visualizing a network 700 of content items arranged according to implementations of this disclosure. The network 700 includes a plurality of nodes 702, e.g., a first node 702(1), a second node 702(2), . . . , and a seventeenth node 702(17). Each of the nodes 702 represents one of the content items in the system, and thus the disclosure is not limited to the number of illustrated nodes. Instead, it is contemplated that the collection 700 will include substantially more nodes 702. In this example, some of the nodes 702 may represent content items shown by representations in the GUIs 100-600 discussed above. For example, the first node 702(1) may correspond to the content of the first representation 106(1) (e.g., the project "Aftermarket Parts Sales"), the second node 702(2) may correspond to the content of the second representation 106(2) (e.g., the category "parts" posted by Don Joe), the third node 702(3) may correspond to the content of the third representation 106(3) (e.g., the "idea" posted by Aristotle), and the fourth node 702(4) may correspond to the content of the fourth representation 106(4) (e.g., to the user "Jane Doe"). The fifth node 702(5) may correspond to the fourth item (not shown in the GUI 100) that is linked to the content of the first representation 106(1). The nodes 702 also are illustrated with type designators 704 (only one of which is labeled for clarity of FIG. 6). The type designators 704 generally correspond to the type designations 112, discussed above. Thus, for example, the type designation associated with the node 702(1), is a "P" because, as described above, the content item of the first representation 106(1) is a "project"-type item. Similarly, the second node 702(2) is designated with a "C" because, as described above in connection with FIG. 1, the content item of the second representation 106(2) is a "category"-type item, like the type designators described above.

FIG. 7 also illustrates how the content items represented by the nodes 702 are linked to each other in the network 700. Specifically, a number of lines 706 are shown (although some of the lines 706 are not labeled, for clarity). These lines signify the existence of a link (at least one link) between nodes. For example, the line 706(1) indicates that the first node 702(1) is linked to the second node 702(2), the second line 706(2) signifies that the first node 702(1) is linked to the third node 702(3), and so forth. Thus, whereas FIG. 1 indicates (by the link count 130) that the content of the first representation 106(1) is linked to four items, the node 702(1) (which in this example corresponds to the project of the first representation 106(1)) is linked to four items, e.g., as shown by the first line 706(1), the second line 706(2), the third line 706(3), and the fourth line 706(4). As shown, the lines 706(1)-706(4) correspond, respectively, to the lines 132(1)-132(4). FIG. 7 includes lines 706 between nodes 702 to show additional links within the network 700. Again, the network 700 is but an example visual representation used to illustrate aspects of this disclosure, the network 700 is not limiting.

FIG. 7 also illustrates how the network may be updated. In the examples of FIGS. 3 and 4 discussed above, the user 402 created a new link between previously unlinked content, e.g. the project of the first representation 106(1) and the user "Don Joe" of the representation 306. In FIG. 4, when the user created the link, e.g., by selecting the unlinked graphic 308, the line 406 was added by the GUI 400. In FIG. 7, this link is visualized as the fifth line 706(5). As illustrated, linking of items in this way creates a sort of "pull" of content. More specifically, whereas the first node 702(1) and the sixth node 702(6) were separated by an intervening node, e.g., the second node 702(2), the line 706(5) demonstrates that the new link is now direct. Practically, then, when a user accesses the project represented by the node 702(1), the user represented by the node 702(6) (e.g., Don Joe) will also be shown as linked. Moreover, the projects that Don Joe created, e.g., the projects represented by the nodes 702(7), 702(8), 702(9) are now "closer" to the project represented by the first node 702(1). Practically, then, when Jane Doe (represented by the fourth node 702(4), and above, by the fourth representation 106(4)) accesses a home page, which may be the GUI 500 of FIG. 5, the projects created by Don Joe may be presented as potentially of interest, e.g., because a suggestion system that populates the home page may consider content that is two links away, but not three or more. In other instances, the link distance may be only one factor and content items that are two or more links away may be prioritized for other reasons.

Other examples for suggesting content items for presentation to a user also are contemplated. For example, the content items may be chosen based on one or more of link strengths, node types and/or other characteristics that can be applied to individual nodes across the network. For example, as just described above, the system can assume that the user will want to see the posts approximated two links away, and leverage only link distance and then the link strength to further prioritize those "close/nearby" nodes. However, there may be nodes that are more than a few links away from the active primary node that may be of interest to the active user. In one example, a primary node may be a user's profile, and based on the primary node and each other node in the network a "Correlational Force" can be calculated as follows:

$$R = 1/(\text{\# of links}) \quad (1)$$

where R is the resistance across any single link between two nodes $$R_{total} = 1/R_1 + 1/R_2 + \ldots + 1/R_n \quad (2)$$

Where the links are in parallel;

$$R_{total} = R_1 + R_2 + \ldots + R_n \quad (3)$$

Where the links are in series; and $$F_{node} = (m_1 * m_2 * \ldots * m_n)/(R^2) \quad (4)$$

where F, is the Correlational Force between a single node in the network and the primary node, and m is a weighted factor based on one or more of information about a recency of the node (e.g., how recently the node was created), node type of the primary node, node type of the node referenced in the equation, or other node-based characteristics.

Using the above equations, the system can prioritize the content item representations for display, e.g., by showing the content items corresponding to the nodes having the highest Correlational Force relative to the primary node. Thus, as users interact with the system to create content items and to organize already-created content items relative to each other, the Correlational Force may be a dynamic parameter that will continue to influence which content items are displayed to the user. For instance, although FIG. 1 generally shows the representations 106(2), 106(3), 106(4) arranged in the list 108 according to link strength, e.g., the number of links between the primary content item and the respective secondary content items, the secondary content items can instead be prioritized based on the Correlational Force. As will be appreciated, by varying the weighting factors, the Correlational Force can also be modified.

Another example of prioritizing content items for presentation to a user will now be described with reference to FIG. 7. In this example, a user may have recently viewed the project represented by node 702(1) and the system may be determining items to present to the user at login, e.g., on a home screen. As illustrated and discussed above, the node 702(1) is directly linked to the nodes 702(2), 702(3), 702(4), and 702(5) (assuming the user has not yet created the link 706(5)). In implementations discussed above, these nodes that are directly linked can be displayed in the "linked" screen, e.g., the GUI 200, whereas it may be desirable to show not-yet-linked content in the home screen. In the example discussed above, items with a link distance of two, e.g., that are linked to a node that is directly linked to the first node 702(1) may be displayed. In FIG. 7, these items would correspond to nodes 702(6), 702(10), 702(13), 702(15), 702(11), and 702(12). Of course, these nodes could be ordered according to their dates, their types, or other criteria. In some instances, they could also be ordered based on the strength of the link. For instance, assume that the node 702(3) and the node 702(10) have been linked by relatively few users whereas the node 702(5) and the node 702(12) have been linked many times. In such an example, the link strength may be used to prioritize the item associated with the node 702(12) over the item associated with the node 702(10). Although this example describes an instance in which items with the link distance of 2 are considered, similar principles can be used for more (or all) nodes in the network 700, at all distances.

Moreover, the link distance and the link strength may be only two factors for determining the relevance of each node. For example, consider the same scenario, in which a home page will be populated with (predicted-to-be) relevant items for consideration by the user. The node 702(15) is linked to the first node 702(1) in several ways, e.g., via the nodes

702(2), 702(6), 702(9), via the nodes 702(4), 702(13), via the node 702(4), and via the nodes 702(11), 702(16). As discussed above, these parallel links may result in a correlational force or pull that may determine that the content item associated with the node 702(15) may be the most relevant, relative to the first node 702(1), and therefore may be displayed first on the home screen. Thus, the node priority or ranking of the nodes may be described as a relationship between the nodes in the network, and the relationship may be a function of the relative position of the nodes in the network, the attributes of each of the links between nodes in the network, and/or additional features. The function may weight certain features or attributes, as discussed above with regard to Equation (1). As will be appreciated, because users are interacting with the system, the network 700 is dynamic, as new links are created, removed, strengthened, and/or weakened. And, because the network 700 is dynamic, node priority (e.g., item priority) may be constantly varying as users interact with the system.

Accordingly, implementations of this disclosure may present content items to system users in an intuitive manner to promote usability and usefulness and/or to allow system users to link content items in an intuitive manner to build the network 700 in an organic way. For example, systems herein may allow the users to create a directory of content items in a system, instead of having that creation driven by an algorithm or other closed system. Moreover, because implementations of this disclosure include both generated, e.g., textual and visual, content items, and users as content items, the system may consider users in the same manner that it creates more conventional content. Thus, the network 700 may organically connect and organize textual or image content, and may also organize users as content items. This may allow users to discover other users through shared interests or the like, e.g., to foster collaboration. In some implementations, each of the nodes 702 that is not a "U" node may be linked to a "U" node. As described further herein, upon creation, image, text, or other content may be linked to its creator. Thus, for example, the user represented by the seventeenth node 702(17) may have created the project item represented by the sixteenth node 702(16).

Figure 8:
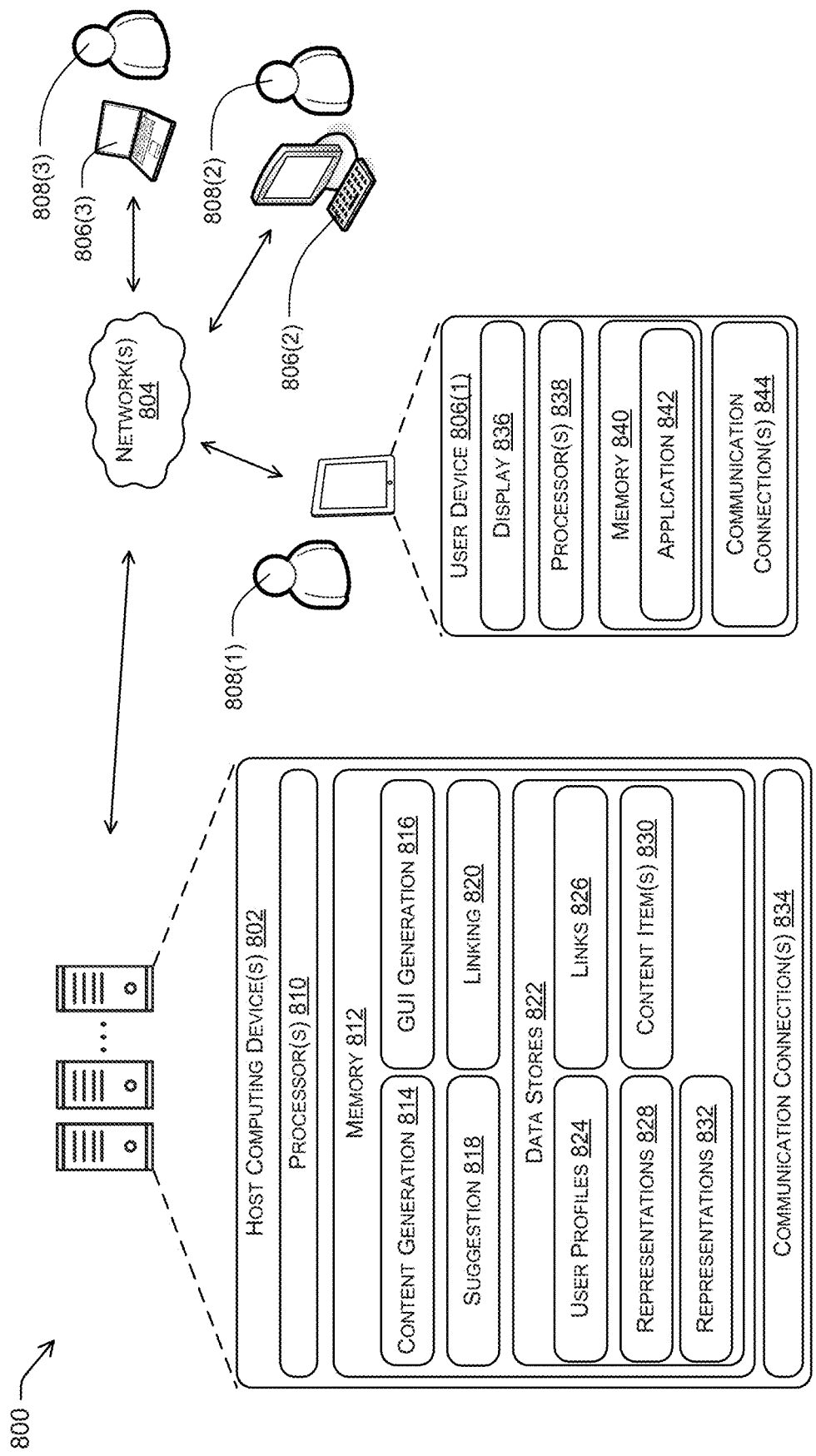
FIG. 8 is an example computing environment for creating topical relationships among content and users in accordance with an example embodiment of the present disclosure.

FIG. 8 is a diagram illustrating an example system 800 for coordinating content in accordance with implementations described herein. In at least one example, the system 800 can include one or more host computing device(s) 802 communicating over a network 804 with a first user device 806(1), a second user device 806(2), and a third user device 806(3) (collectively, "the user devices 806). Although three user devices 806 are illustrated, more or fewer user devices 806 may be associated with the system 800. One of the user devices 806 may be the user device 102, for example. As also illustrated in FIG. 8, a first user 808(1) is associated with the first user device 806(1), a second user 808(2) is associated with the second user device 806(2), and a third user 808(3) is associated with the third user device 806(3). The network 804 may include a local area network (LAN), a wide area network (WAN), including but not limited to the Internet, or any combination thereof, and may include both wired and wireless communication technologies using any suitable protocols and communication techniques. Some non-limiting examples of the user devices 806 may include tablet computing devices (as shown by the first user device 806(1)), desktop computing devices (as shown by the second user device 806(2)), laptop computing devices (as shown by the third user device 806(3)), mobile computing devices, or any other device capable of accessing and rendering graphical user interfaces and communicating with the host computing device(s) 802.

The host computing device(s) 802 can include processor(s) 810 and memory 812 communicatively coupled with the processor(s) 810. In the illustrated example, the memory 812 of the host computing device(s) 802 stores a content generation system 814, a graphical user interface (GUI) generation system 816, a suggestion system 818, and a linking system 820. Although these systems are illustrated as, and will be described below as, separate components, functionality of the various systems may be attributed differently than discussed. Moreover, fewer or more systems and components may be utilized to perform the various functionalities described herein. The memory 812 may also include data stores 822, which may include user profiles 824, links 826, representations 828, content items 830 and additional information 832. Though depicted in FIG. 8 as residing in the memory 812 for illustrative purposes, it is contemplated that the content generation system 808, the GUI generation system 816, the suggestion system 818, the linking system 830 and/or any or all of the data stores 822 may additionally, or alternatively, be accessible to the host computing device(s) 802 (e.g., stored on, or otherwise accessible by, memory remote from the host computing device(s) 802).

In at least one example, the content generation system 814 can include functionality to generate content items, such as those indicated by the representations 106 of FIG. 1, and/or functionality to generate the representations of content items, such as the representations 106 of FIG. 1. For example, the content generation system 814 can cause a number of GUIs to be displayed at one of the user devices 806 that facilitate entry of content by the users 808. In some examples, the content generation system 814 may access templates, which may be part of the representations 828, with fillable fields for entering images and/or text. The content generation system 814 may also facilitate the linking of external content, e.g., via hyperlink or the like. In some implementations, the content generation system 814 may also access one or more of the data stores 822 to generate content items and/or generate representations indicative of the content items. By way of non-limiting examples, the content generation system 814 may access the user profiles 824 to obtain a user name, a date the user 808 became a part of the system, or the like, and/or the content generation system 814 may access the links 826 to determine information for populating a link count (like the link count 130 of FIG. 1) and/or a link counter (like the link counter 138). In some examples, the content generation system 814 may store generated content as one or more of the content items 830.

In some examples, the GUI generation system 816 can include functionality to generate one or more interactive interfaces, such as the GUIs 100, 200, 300, 400, 500 for presentation on the user devices 806. In some examples, the GUI generation system 816 may receive information from the content generation system 814, the suggestion system 818, the linking system 820, and/or the data stores 822 to generate the GUIs. By way of nonlimiting example, and with reference to FIG. 1, the GUI generation system 816 may receive information about the representations 106 from the content generation system 814 and may populate the list 108 according to the number of links stored as the links 826, e.g., the number shown in the link counter 138. Moreover, with reference to FIG. 3, the GUI generation system 816 may receive information about the additional representation 306 from the suggestion system 818.

The suggestion system 818 may include functionality to identify content to be displayed to the users 808. For example, the suggestion system 818 may use a search engine to find content items in response to a user search request, as shown generally in the examples of FIGS. 3 and 4, or as discussed above in connection with the Correlational Pull description and Equations 1-4. In some examples, the suggestion system 818 may identify content items in the absence of a search. For instance, the suggestion system 818 may identify new, trending, or other content items that may be of interest to an individual user. In some instances, the suggestion system 818 may include a predictive algorithm that attempts to determine content items that may be of interest to the user. For example, the suggestion system 818 may look to a link distance between items to make suggestions. For example, the suggestion system 818 may identify all items that are two links away from the user's 108 profile to display content items that may of interest. As used herein, "two links away from the user's profile" may refer to content items that are not directly linked to the user's profile, but that are directly linked to items directly linked to the user's profile. In some instances, the suggestion system 818 may identify content items in this manner to populate a portion of a home page, which may be the GUI 500 shown in FIG. 5.

The linking system 820 may include functionality to allow users to link content items as described herein and/or to facilitate link counting. For example, the linking system 820 may provide information to the GUI generation system 816 indicative of whether content items are linked, how many times the items are linked, to what items they are linked, and the like. The linking system 820 may also, or alternatively, provide information to populate a link count, e.g., the link count 130, and/or a link counter, e.g., the link counter 138. Moreover, the linking system may receive information about a user input to create a new link or to affirm an existing link. The linking system 820 may use such information to update and/or maintain the links 826.

The host computing device(s) 802 may also include communication connection(s) 834 that enable communication between the host computing device(s) 802 and other local or remote device(s). For instance, the communication connection(s) 834 can facilitate communication with the user devices 806, such as via the network(s) 804. The communications connection(s) 834 can enable Wi-Fi-based communication such as via frequencies defined by the IEEE 802.11 standards, short range wireless frequencies such as BLUETOOTH®, other radio transmission, or any suitable wired or wireless communications protocol that enables the respective computing device to interface with the other computing device(s).

In some implementations, the host computing device(s) 802 can send information, such as instructions to generate GUIs, to the user device(s) 806, via the network(s) 804. The user device(s) 806 can receive such information from the host computing device(s) 802 and display the GUIs on a display 836 of the user device 806. In some implementations, the user device(s) 806 can perform some of the functions attributed to the host computing device(s) 802, including generating the GUIs, for example. To facilitate creation of the GUIs, the user device(s) 806 may receive information from the host computing device(s) 802. In at least one example, the user device(s) 806 can include processor(s) 838 and memory 840 communicatively coupled with the processor(s) 838. In the illustrated example, the memory 840 of the user device(s) 806 may store an application 842. The application 842 may be hosted by the host computing device(s) 802, e.g., to perform functionality described herein.

The user devices 806 may also include communication connection(s) 844 that enable communication between the user device(s) 806 and other local or remote device(s). For instance, the communication connection(s) 844 can facilitate communication with the host computing device(s) 802, such as via the network(s) 804. The communications connection(s) 844 can enable Wi-Fi-based communication such as via frequencies defined by the IEEE 802.11 standards, short range wireless frequencies such as BLUETOOTH®, other radio transmission, or any suitable wired or wireless communications protocol that enables the respective computing device to interface with the other computing device(s).

The processor(s) 810 of the host computing device(s) 802 and the processor(s) 838 of the user device(s) 806 can be any suitable processor capable of executing instructions to process data and perform operations as described herein. By way of example and not limitation, the processor(s) 810, 838 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 812 and the memory 840 are examples of non-transitory computer-readable media. The memory 812, 840 can store an operating system and one or more software applications (including the application 842), instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

Although various systems and components are illustrated as being discrete systems, the illustrations are examples only, and more or fewer discrete systems may perform the various functions described herein. Moreover, functionality ascribed to the host computing device(s) 802 may be performed at the user device(s) 806.

Figure 9:
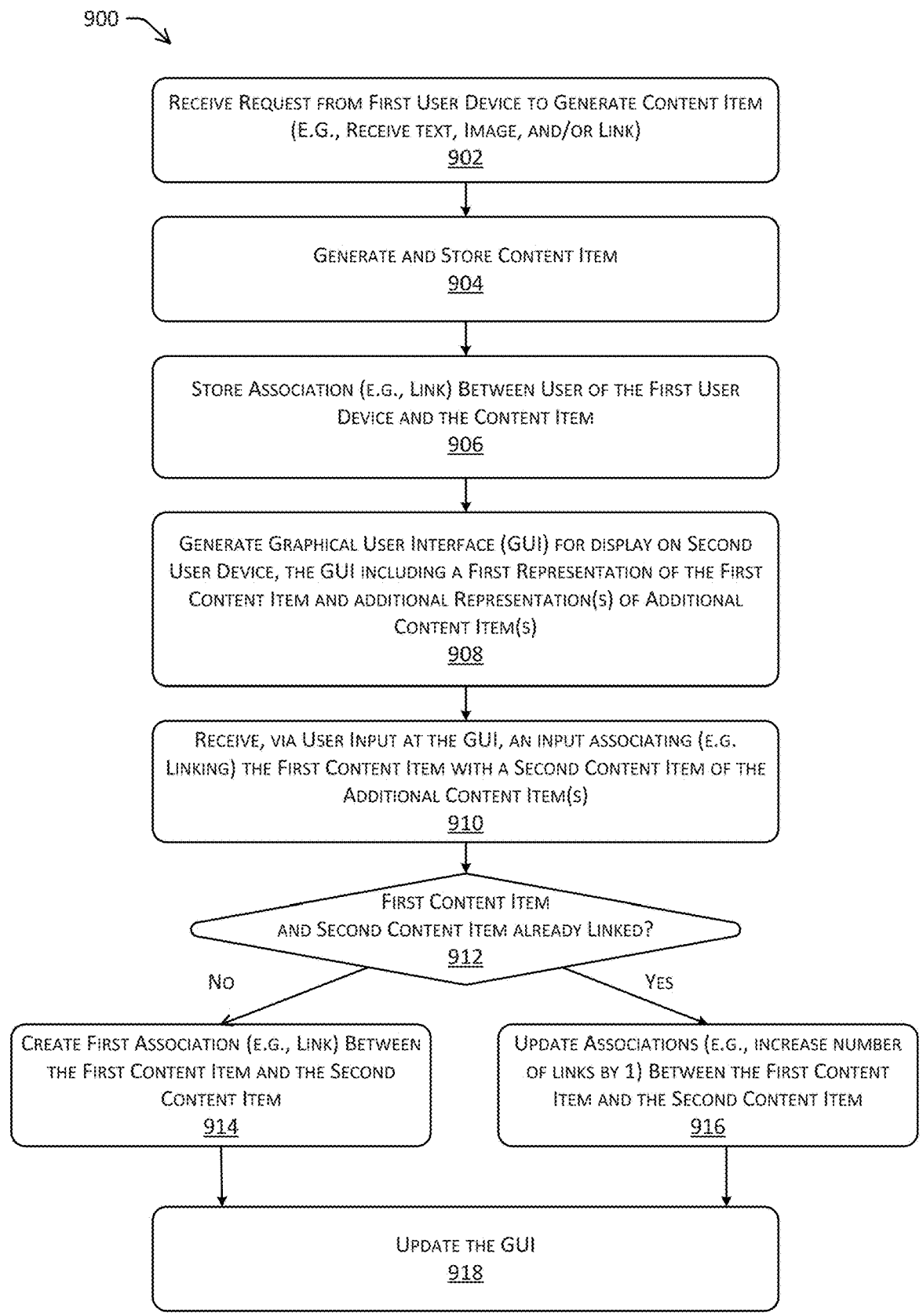
FIG. 9 is a flowchart illustrating creation and association of content in accordance with an example embodiment of the present disclosure.
Figure 10:
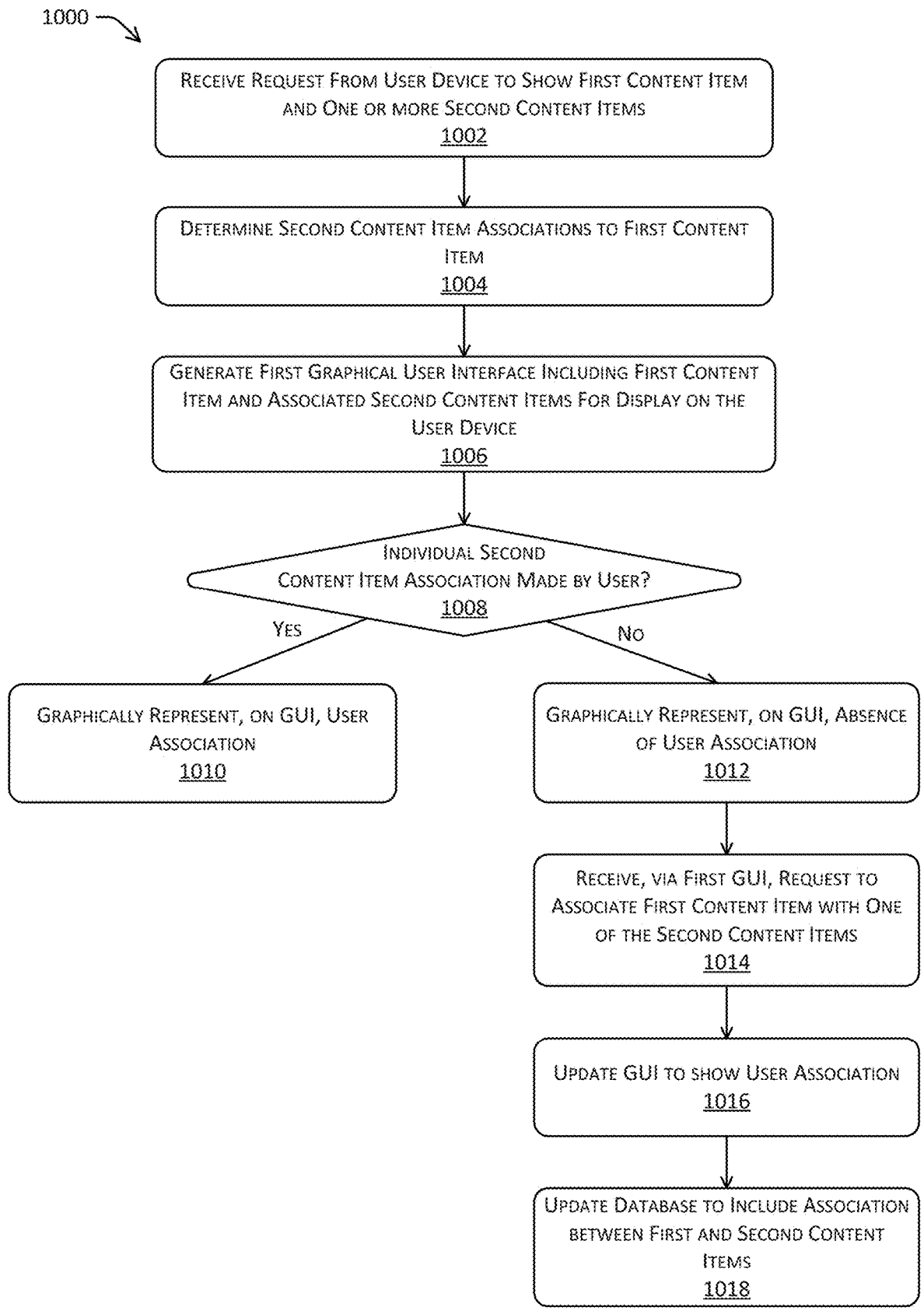
FIG. 10 is a flowchart illustrating association of content in accordance with an example embodiment of the present disclosure.

FIGS. 9 and 10 illustrate flow charts depicting example processes 900, 1000 of the present disclosure, which may be related to interaction with data systems, as described herein. The example processes 900, 1000 are illustrated as a collection of steps in a logical flow diagram, which steps represent acts or operations that can be implemented in hardware, software, or a combination thereof. In the context of software, the steps represent computer-executable instructions stored in memory. When such instructions are executed by, for example, the processor(s) 810, such instructions may cause the processor(s) 810 and/or various components of the computing device(s) 802 to perform the recited acts or operations. Such computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the processes 900, 1000 are described with reference to the GUIs 100, 300, 300, 400, 500, 600 the visualization of the network 800, the system 8800, and/or other items shown in FIGS. 1-88.

The process 900 is illustrated in FIG. 9 and generally describes a method of creating and associating content items in a networked system. The process 900 includes, at 902, receiving a request from a first user device to generate a content item. For example, implementations described herein may allow a user to create, via the user device 102 content items for inclusion in the system. In some examples, the user may provide text, images, and/or links to other information or data, e.g., external information, such as web pages, documents, sound clips, videos, or the like. Techniques described herein, e.g., as implemented by the content generation system 814 may provide a user, e.g., via the user device 102, with one or more fillable templates, which may look like one of the representations 106, to receive the request to create the content items. In some examples, the process 900 may promote the creation of different types of content items, as described further herein, and the request may include a content item type.

The process 900 may also include, at 904, generating and storing the content item. For example, the host computing device 802, e.g., implementing the content generation system 814 may create the content item from information input by the user at 902. The content generation system 814 may also include other information, such as user information, date/time information and/or other information to create the content item. In some implementations, the host computing device 802 may store the content item in the data stores 822, e.g., as one of the content items 830.

The process 900 may also include, at 906, storing an association, e.g., a link, between a user of the first user device and the content item. For example, and as described further herein, techniques of this disclosure may promote the organization of content, including user profiles via associations or links between content items. In examples described herein, when a user creates content items, the user may be automatically linked to the content items she created. Thus, for example, in the GUI 100 of FIG. 1, the first representation 106(1) is shown as being linked to the fourth representation 106(4), which is the content item, i.e., the user profile, associated with Jane Doe, the creator of the content items identified by the first representation 106(1). Similarly, the network 600 shows that each of the nodes 602 that is not indicative of a user as content item is linked to a "user" node. In implementations described herein, a link between a user and the content items s/he created may not be removable, even by the creator.

The process 900 may also include, at 908, generating a GUI for display on a second user device, the GUI including a first representation of the first content item and additional representations of additional content items. For example, in some implementations, the GUI 100 may be generated on the user device 102 with a plurality of representations 106, including the "in focus" or primary representation 106(1) and the other representations 106 being provided in the list 108. In the example of FIG. 1, the first representation 106(1) may be the representation of the content item created at 904 and the representation 106 in the list 108 may be the additional representations. The additional representations may also include the fourth representation 106(4), which is the user profile associated with the content item at 906. In the example of FIG. 1, each of the items associated with the representations 106 in the list 108 are linked to the primary reference, although in other implementations, some or all of the additional representations may not be linked. For instance, FIG. 3 illustrates an example in which the representation 306 is not linked to the first representation 106(1). In that example, the representation 306 is included in response to a search, although in other implementations, one or more non-linked representations may also or alternatively be populated in the list 108 according to a suggestion, according to previous viewing by the user, according to previous flagging by the user, according to their link distance, or otherwise.

The process 900 may also include, at 910, receiving, via a user input at the GUI, an input associating, e.g., linking, the first content item with a second content item of the additional content items. For example, a user may interface with the GUI to create an association or link between two representations of content items, to create a link therebetween. FIG. 2 is an example of a user 202 creating a link by selecting an existing line and FIG. 4 is an example of a user 402 creating a link between previously unlinked content item.

The process 900 may also include, at 912, determining whether the first content item and the second content item are already linked. As noted above, a user may be able to create new links between content items and affirm already-created links.

If it is determined at 912 that the first content item and the second content item are not already linked, the process may also include, at 914, creating a first association between the first content item and the second content item. For example, the techniques described herein may allow system users to link content items they believe to be related and in some instances, the linking system 820 may store a new link or association, e.g., as one of the links 826 in the data stores 822. FIG. 8 conceptualizes the creation of the association, e.g., as the dashed line 606(5), in the network 600 of content items.

Alternatively, if it is determined at 912 that the first content item and the second content item are already linked, the process 900 may include, at 916, updating the association between the first content item and the second content item. For example, the linking system 820 may increase a strength of the link between the content item and the second content item, e.g., by incrementally increasing a number of links between the first content item and the second content item. As described herein, each user may be able to create only one link between two content items. Thus, for example, the strength of a link, which may be the number of users who have linked two content items, will be between 1 (because each content item preferably is linked to its creator's user profile) and a maximum number corresponding to the number of users. By allowing each user to create only one link between two items, techniques described herein may provide a highly democratic process in which each user gets an option to link any two content items, but only gets one "vote."

The process 900 may also include, at 918, updating the GUI. For example, the GUI generating system 816 may cause the GUI to be updated to visually depict the new link or the increased link strength. FIG. 2 illustrates an example in which a link counter 138 is incrementally increased in the instance of an already-existing link, and FIG. 4 illustrates the inclusion of the linked graphic 404 and the new line 406 linking the previously unlinked content item.

The process 1000 is illustrated in FIG. 10 and generally describes another method of creating and associating content items in a networked system. The process 1000 includes, at 1002, receiving a request to show a first content item and one or more second content items. For example, a user may select a representation of a content item as the first content item on which to focus. For example, the user may select the content item from an array, such as the array 504 shown in FIG. 5, from a list such as the list 108, or otherwise. Moreover, the host computing device(s) 802, e.g., using the suggestion system 818, may determine one or more second items for displaying to the user with selected item. The second items may be chosen because they are linked to the selected content item, because they have been previously flagged by the user, because they have been recently viewed by the user, because they are newly added to the system, or based on some other criteria as described further herein.

The process 1000 may also include, at 204, determining second content item associations to the first content item. For example, the GUI generation system 816 may access the links 826 in the data stores 822 to determine, for each of the second content items, whether the second content items are already linked to the first content item and/or a strength of the link, if one exists.

The process 1000 may also include, at 1006, generating a first graphical user interface including the first content item and the associated second content items for display on the user device. For example, the GUI generation system 816 may generate a GUI that includes a first representation of a first content item set apart from the other, related content items. For example, the GUI may be the GUI 100 in which the first representation 106(*a*) is rendered on a left side of the display and the other representations 106 are presented on the list 108, alongside the first representation 106(1). Other implementations may otherwise arrange representations of the content items relative to each other.

The process 1000 may also include, at 1008, determining, for each of the second items, whether the user has made an association of the second content item with the first content item. For example, the GUI generation system 816 may retrieve information about one or more of the links 826 and/or additional information 832 to determine whether the user accessing the system has already linked the first content item and the second content item(s). As described further herein, content items comprising user profiles may be automatically linked to content item created by the user. Thus, for example, the user may have been determined to have automatically linked the first content item and the second content item when one is the user's profile and the other is some other item generated by the user.

If it is determined at 1008 that the user has associated the first content item and one of the second content items, at 1010, the process 1000 includes graphically representing, on the GUI, the user association. For example, because the user has already associated two content items, she cannot create another link, and thus the GUI is rendered in a way that demonstrates that the user has already associated the two items. In the example of FIG. 1, the third line 132(3) is shown with a heavier line weight, and with the linked graphics 134, for example. In other implementations, the link may be otherwise visualized on the GUI. Although not shown in the process 1000, in some implementations, the user may be able to remove an existing link she has created. However, for reasons discussed herein, some examples may prohibit the user from disassociating her profile content item from the content items she created absent deleting the content item.

If it is determined at 1008 that the user has not yet associated the first content item and one of the second content items, at 1012, the process may graphically represent, on the GUI, the absence of the user association. For example, the GUI may be rendered to show that the user has not linked certain of the second content items to the first content item, and may provide controls for doing so. In the example of FIG. 1, the first line 132(1), the second line 132(2), and the fourth line 132(4) are shown with a relatively lighter line weight, for example. In the example of FIG. 3, in which the content item of the representation 306 is not linked by any user to the content item of the first representation 106(1), the unlinked graphic 308 (and the absence of a connecting line) may indicate that the content items are not linked. In other implementations, the absence of a link by the user may be otherwise visualized on the GUI. By way of non-limiting example, dashed or dotted lines may be used instead of the lighter-weight lines.

The process 1000 may also include, at 1014, receiving, via a user input at the GUI, a request to associate the first content item with one of the second content items. For example, a user may interface with the GUI to create an association or link between two representations of content items, to create a link therebetween. FIG. 2 is an example of a user 202 creating a link by selecting an existing line, and FIG. 4 is an example of a user 402 creating a link between previously unlinked content items.

The process 1000 may also include, at 1016, updating the GUI to show the user association. For example, the GUI generating system 816 may cause the GUI to be updated to visually depict a new link (when the content items were not previously linked) or to increase the link strength (when the content items were previously associated). FIG. 2 illustrates an example in which a link counter 138 is incrementally increased in the instance of an already-existing link, and FIG. 4 illustrates the inclusion of the linked graphic 404 and the new line 406 linking the previously unlinked content items.

The process 1000 may also include, at 1018, updating a database to include the association between the first and second content items. For example, the linking system 820 may store a new link or association, e.g., as one of the links 826 in the data stores 822, or increment a number of the links or associations, if a link already exists.

INDUSTRIAL APPLICABILITY

The present disclosure provides improved computing systems and methods for storing and accessing data in networked systems. Such systems and methods may be used to more efficiently coordinate activities of the computing systems in the network and/or to enhance usability for users of the system. For example, such systems and methods may enable a computing system 130 to provide an open system in which users can provide inputs to create links between documents. As more links are provided, users may be introduced to more pertinent and/or helpful content and users. As a result, the computing system may coordinate nodes in a network with improved accuracy, and thus, may maximize efficiency for the users. Additionally, such systems and methods may be used to create a user-sourced catalog of content items in a system, thereby providing improved user efficiency and engagement.

As noted above with respect to FIGS. 1-10, example processing of creating links between nodes includes storing discrete content items in a system. Such content items may include text, images, video, audio, hyperlinks to external information, user profile information, and/or the like. In some examples, a plurality of content items may be presented on a graphical user interface (GUI) as a plurality of representations. In some examples, content items may be classified as one of a plurality of predetermined types of content items. The GUI may present one content item as a primary or "in focus" content item and other content items as subordinate items. In some instances, the GUI may indicate whether the in-focus representation is linked to other of the content items on the GUI. In implementations described herein, a "link" may be an indication made by a user of the system that two content items are in some way related. The subordinate items may be all linked items, as in the example of FIG. 1. In implementation, each user is allowed to link any two content items, but may make only a single link between any two items. Thus, for example, each user gets (only) a single "vote" as to whether two content items should be linked. Users may also remove links they have previously created.

By linking content items according to embodiments described herein, a network of items, such as the network 700 shown in FIG. 7 continues to evolve to create connections between users and content items. By allowing users to create links between nodes, the users may be able to share the responsibility for organizing the nodes, and therefore the content items. For instance, as more links are created, the links become a useful tool in determining relationships between content items, e.g., by decreasing a link distance between content items. Such relationships may be a powerful tool in suggesting new content items to users of the system. For example, as discussed herein, content items with a direct link may be shown together with an in-focus content item and content items with a link distance of two or more links may be prioritized when suggesting new content items to the user. Moreover, as existing links are confirmed by additional users, link strength can also become a useful tool in suggesting additional content items to users. Thus, in some implementations, users can find other users and/or other types of content items by commonly-linked content, or several users can all be linked to a single content item. Other use cases are described herein.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system comprising:
   one or more processors; and
   memory storing instructions executable by the one or more processors to cause the system to perform acts comprising:
      storing a plurality of content items comprising a first content item and one or more second content items;
      storing one or more associations, an association of the one or more associations being an association between the first content item and a second content item of the one or more second content items;
      maintaining a number of instances of the association;
      causing a graphical user interface to be presented on a display of an electronic device, the graphical user interface including a first representation of the first content item, a second representation of the second content item, and a third representation of the association;
      receiving a user input at the first graphical user interface, the user input comprising an indication associating the first content item and the second content item;
      based at least in part on the user input, incrementally increasing the number of instances of the association between the first content item and the second item to generate, based on the indication, an additional instance of the association; and
      updating the graphical user interface to indicate the incremental increase of the number of instances of the association between the first content item and the second content item.

2. The system of claim 1, wherein the graphical user interface is a first graphical user interface, the acts further comprising:
   receiving a request to display a third content item;
   at least in part in response to the request to display the third content item, causing a second graphical user interface to be presented on the display, the second graphical user interface including a third representation of the third content item;
   receiving a second user input to associate the third content item with the second content item;
   at least in part in response to receiving the second user input, updating the second graphical user interface to include a visual representation of an association between the first content item and the third content item; and
   storing a second association between the first content item and the third content item as one of the one or more associations.

3. The system of claim 2, the acts further comprising:
   determining the third content item based at least in part on a relationship of the third content item with the first content item, the relationship including at least one of a relative position of the first content item and the third content item in a network comprising one or more links between at least two of the first content item, the second content item, and the third content item or a strength of at least one of the one or more links.

4. The system of claim 3, wherein:
   the relationship comprises a function of at least one of the relative position or the strength, and
   the relative position comprises information about one or more intervening nodes linking the first content item and the third content item in the network.

5. The system of claim 1, wherein the first representation is a primary representation and the second representation is a secondary representation displayed in a list of secondary representations corresponding to additional of the one or more second content items.

6. The system of claim 5, the actions further comprising:
   generating an order for the list of secondary representations based at least in part on at least one of the number of instances of the association or a number of instances of at least one other of the one or more associations, wherein the second representation is arranged in the list of secondary representations based at least in part on one or more of the number of instances of the association between the first content item and the second content item, a characteristic of the first content item, or a characteristic of the second content item.

7. The system of claim 1, wherein the graphical user interface further comprises a visual indication of the association between the first content item and the second content item, the visual indication comprises a user interface element disposed between the first representation and the second representation, and the user input comprises a selection of the user interface element, the acts further comprising:

based at least in part on the user input, updating the graphical user interface by replacing the visual indication of the association between the first content item and the second content item with a second visual indication.

8. The system of claim 1, the acts further comprising:

based at least in part on the user input, updating a visual link counter associated with the second representation to indicate the incremental increase in the number of instances of the association between the first content item and the second item.

9. The system of claim 1, wherein the graphical user interface further comprises a first link count associated with the first representation and indicating a number of content items to which the first content item is associated and one or more second link counters associated with the secondary representation, a second link counter of the second link counter indicating the number of instances corresponding to the first association between the first content item and the second content item.

10. The system of claim 1, wherein the first content item comprises a content item other than a user profile, one of the one or more second content items comprises a user profile of a creator of the first content item, and one of the one or more associations includes an association of the first content item with the user profile.

11. A method comprising:

storing a plurality of content items;

storing one or more associations, an association of the one or more associations comprising a first association between a first content item of the plurality of content items and a second content item of the plurality of content items;

causing a graphical user interface to be presented on a display of an electronic device, the graphical user interface including:
 a first representation of the first content item,
 a second representation of the second content item,
 a third representation of a third content item of the plurality of content items,
 a first visual indicator indicating the first association, and
 a second visual indicator indicating a second association between the first content item and the third content item;

maintaining a count of a number of instances of the first association between the first content item and the second content item;

receiving a user input at the first graphical user interface, the user input comprising an instruction to create an additional association between the first content item and the second content item;

based at least in part on the user input, updating the first visual indicator to a third visual indicator representing an additional instance of the first association; and based at least in part on the user input, incrementally increasing the count of the number of instances of the first association.

12. The method of claim 11, wherein the graphical user interface is a first graphical user interface and the user input is a first user input, the method further comprising:

receiving a second user input comprising a command for additional content items;

based at least in part on the command, causing a second graphical user interface to be presented on the display, the second graphical user interface including a fourth representation of a fourth content item in the list of representations, the one or more associations excluding an association between the first content item and the fourth content item, and the fourth representation including a fourth visual indicator indicating the exclusion of the association between the first content item and the fourth content item;

receiving a third user input, the third user input comprising an instruction to create an additional association between the first content item and the fourth content item; and based at least in part on the third user input, storing an additional association between the first content item and the fourth content item.

13. The method of claim 12, further comprising:

determining the fourth content item based at least in part on a relationship of the fourth content item with the first content item, the relationship including at least one of a relative position of the first content item and the fourth content item in a network comprising one or more links between at least two of the first content item, the second content item, the third content item, and the fourth content item or a strength of at least one of the one or more links.

14. The method of claim 11, wherein the first visual indicator comprises a first integer equal to the number of associations between the first content item and the second content item and the third visual indicator comprises a second integer greater by one that the first integer.

15. The method of claim 11, wherein the first content item comprises other than a user profile.

16. A system comprising:

one or more processors; and memory storing instructions executable by the one or more processors to cause the system to perform acts comprising:

storing a plurality of content items;

storing one or more associations, each of the one or more associations comprising an association between exactly two of the plurality of content items;

causing a graphical user interface to be presented on a display of an electronic device, the graphical user interface including:
 a first representation of a first content item of the plurality of content items,
 a second representation of a second content item of the plurality of content items,
 a third representation of a third content item of the plurality of content items, a first visual indicator indicating a first association, of the one or more associations, between the first content item and the second content item, and a second visual indicator indicating a second association, of the one or more associations, between the first content item and the third content item;

maintaining a first count of a first number of instances of the first association between the first content item and the second content item and maintaining a second count of a second number of instances of the second association between the first content item and the third content item;

receiving a user input at the first graphical user interface, the user input comprising an instruction to create an additional instance of the first association between the first content item and the second content item;

based at least in part on the user input, updating the first visual indicator to a third visual indicator, the third visual indicator indicating that a user associated with the electronic device has created the additional instance of the first association; and based at least in part on the user input, incrementally increasing the first count of the first number of instances of the first association between the first content item and the second content item.

17. The system of claim 16, wherein the graphical user interface is a first graphical user interface and the user input is a first user input, the acts further comprising:

receiving a second user input comprising a command for additional content items;

based at least in part on the command, causing a second graphical user interface to be presented on the display, the second graphical user interface including a fourth representation of a fourth content item in the list of representations, the one or more associations excluding an association between the first content item and the fourth content item, and the fourth representation including a fourth visual indicator indicating the exclusion of the association between the first content item and the fourth content item;

receiving a third user input at the fourth visual indicator, the third user input comprising an instruction to create an additional association between the first content item and the fourth content item; and based at least in part on the third user input, storing an additional association between the first content item and the fourth content item.

18. The system of claim 17, the acts further comprising:

based at least in part on the third user input, removing the fourth visual indicator and providing a fifth visual indicator indicating the additional association between the first content item and the fourth content item.

19. The method of claim 16, wherein the first visual indicator comprises a first integer equal to the number of associations between the first content item and the second content item and the third visual indicator comprises a second integer greater by one that the first integer.

20. The method of claim 16, wherein the first content item comprises other than a user profile.

* * * * *